US009602962B2

(12) United States Patent
Edge

(10) Patent No.: US 9,602,962 B2
(45) Date of Patent: Mar. 21, 2017

(54) METHODS AND SYSTEMS FOR PROVIDING LOCATION BASED SERVICES IN A VENUE USING FEMTOCELLS

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 14/597,056

(22) Filed: Jan. 14, 2015

(65) Prior Publication Data

US 2015/0201305 A1    Jul. 16, 2015

Related U.S. Application Data

(60) Provisional application No. 61/927,875, filed on Jan. 15, 2014.

(51) Int. Cl.
*H04W 4/02* (2009.01)
*H04W 4/04* (2009.01)
*H04W 84/04* (2009.01)

(52) U.S. Cl.
CPC ............ *H04W 4/02* (2013.01); *H04W 4/021* (2013.01); *H04W 4/043* (2013.01); *H04W 84/045* (2013.01)

(58) Field of Classification Search
CPC ............... H04W 84/045; H04W 24/02; H04W 36/0083; H04W 36/0072; H04W 36/04;
(Continued)

(56) References Cited

U.S. PATENT DOCUMENTS 8,619,674 B1 * 12/2013 Shipley ................... H04W 4/00
370/328
2006/0014531 A1 * 1/2006 Nam .................. G06Q 30/0207
455/418
(Continued)

FOREIGN PATENT DOCUMENTS

WO    WO-2013188717 A2    12/2013

OTHER PUBLICATIONS

International Search Report and Written Opinion—PCT/US2015/011650—ISA/EPO—May 13, 2015.

*Primary Examiner* — Hirdepal Singh
(74) *Attorney, Agent, or Firm* — Berkeley Law & Technology Group, LLP

(57) ABSTRACT

Disclosed are systems, methods and devices for application of location based services in a venue or other local area using mobile centric and network centric positioning techniques. In particular, a venue may deploy an architecture comprising a location server, a location based services application server and an access/location network comprising femtocell transceivers and optionally WiFi access points to provide location services and possibly communications services to local mobile devices. Mobile devices may be identified to femtocell transceivers using a global provider identifier and femtocell transceivers may communicate with the location server in support of positioning operations using a Positioning Calculation Application Part (PCAP) protocol or LTE Positioning Protocol A (LPPa).

54 Claims, 10 Drawing Sheets

(58) Field of Classification Search
CPC ....... H04W 4/02; H04W 12/06; H04W 16/18; H04W 16/32; H04W 36/0022; H04W 48/16; H04W 4/043; H04W 4/24; H04W 64/00; H04W 68/00
USPC ........................................................ 455/456
See application file for complete search history.

(56) References Cited

U.S. PATENT DOCUMENTS

| | | | |
|---|---|---|---|
| 2010/0167734 A1 | 7/2010 | Jones et al. | |
| 2010/0278141 A1 | 11/2010 | Choi-Grogan et al. | |
| 2011/0081918 A1 | 4/2011 | Burdo et al. | |
| 2011/0294506 A1 | 12/2011 | Claussen et al. | |
| 2012/0136623 A1* | 5/2012 | Edge | G01S 5/0284 702/150 |
| 2012/0188941 A1 | 7/2012 | Li et al. | |
| 2012/0244883 A1* | 9/2012 | Tibbitts | H04W 48/04 455/456.2 |
| 2013/0067552 A1* | 3/2013 | Hawkes | H04L 63/166 726/7 |
| 2013/0109345 A1 | 5/2013 | Edge et al. | |
| 2013/0339478 A1* | 12/2013 | Edge | H04L 67/16 709/217 |
| 2014/0192735 A1* | 7/2014 | Sridharan | H04W 8/26 370/329 |
| 2015/0091757 A1* | 4/2015 | Shaw | G01S 5/02 342/385 |
| 2015/0223185 A1* | 8/2015 | Harris | G01S 5/0236 455/456.5 |
| 2015/0230055 A1* | 8/2015 | Smith | H04W 64/00 455/456.3 |

\* cited by examiner

METHODS AND SYSTEMS FOR PROVIDING LOCATION BASED SERVICES IN A VENUE USING FEMTOCELLS

CROSS-REFERENCE TO RELATED APPLICATIONS

This application claims the benefit of U.S. Provisional Application Nos. 61/927,875, entitled "METHODS AND SYSTEMS FOR PROVIDING LOCATION BASED SERVICES IN A VENUE USING FEMTOCELLS," Jan. 15, 2014, which is assigned to the assignee hereof and which is expressly incorporated, in its entirety, herein by reference.

BACKGROUND

Field

Embodiments described herein are directed to application of efficient network architectures and message flows among devices to provide a location based service in a venue or other localized areas.

Information

The global positioning system (GPS) and other like satellite and terrestrial positioning systems have enabled location (e.g. navigation) services for mobile handsets in outdoor environments. Likewise, particular techniques for obtaining estimates of positions of a mobile device in indoor environments may enable enhanced location based services (LBS) in particular indoor venues such as residential, governmental or commercial venues.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
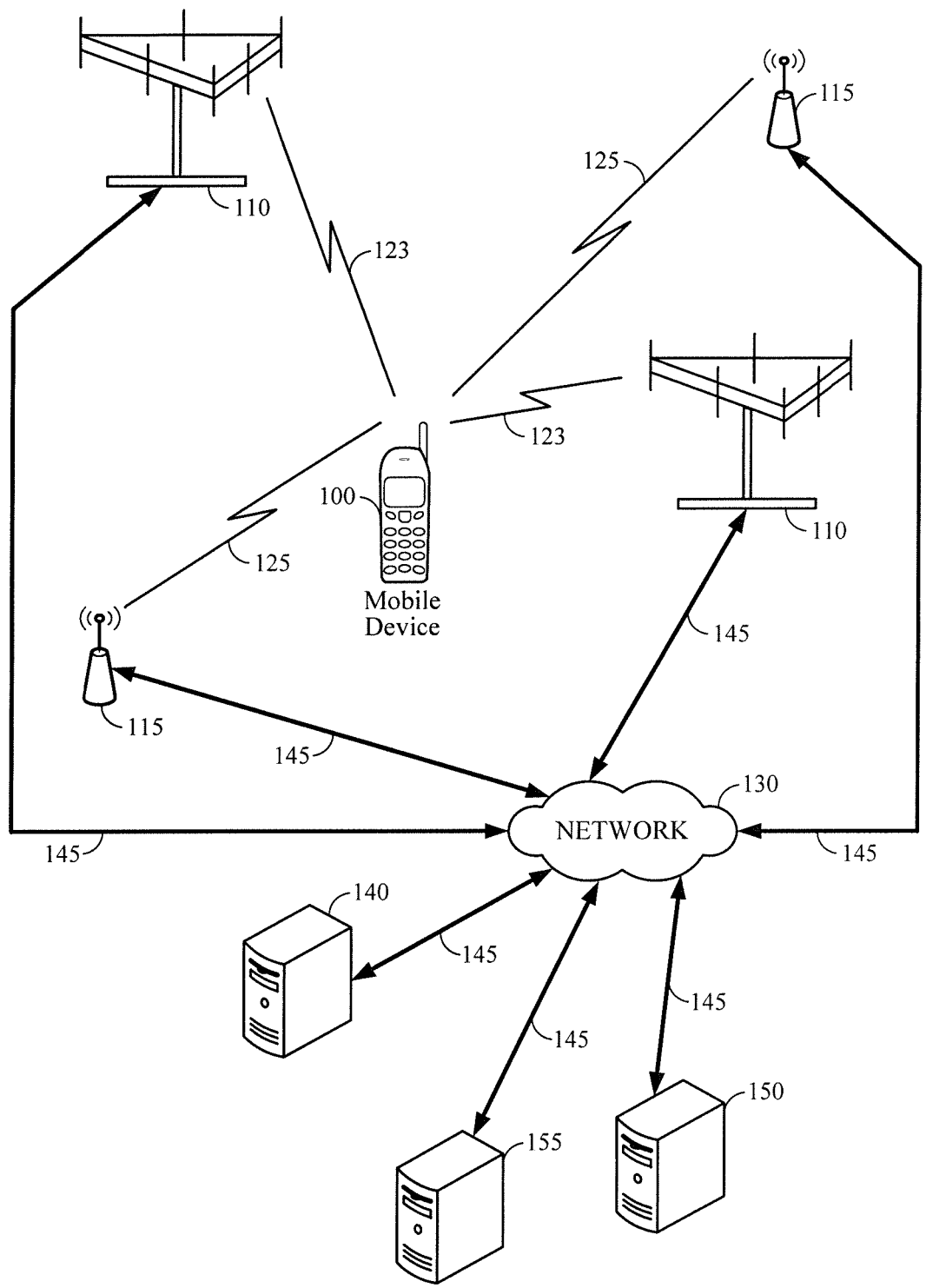
FIG. 1 is a system diagram illustrating certain features of a system containing a mobile device, in accordance with an example implementation.

Briefly, particular implementations are directed to a method at a mobile device comprising: determining a global unique identifier for the mobile device, the global unique identifier being recognizable by femtocell transceivers in a venue, the global unique identifier being determined independently of any public operator-defined globally unique identifier; transmitting at least one message to a location server comprising the global unique identifier; and transmitting one or more wireless signals which are acquirable by at least one of the femtocell transceivers for supporting positioning operations by the at least one of the femtocell transceivers in communication with the location server.

Another particular implementation is directed to a mobile device comprising: a transceiver to transmit messages to and receive messages from a wireless communication network; and one or more processors to: determine a global unique identifier for the mobile device, the global unique identifier being recognizable by femtocell transceivers in a venue, the global unique identifier being determined independently of any public operator-defined globally unique identifier; initiate transmission of at least one message through the transceiver to a location server, the at least one message comprising the global unique identifier; and initiate transmission of one or more wireless signals through the transceiver which are acquirable by at least one of the femtocell transceivers to obtain the global unique identifier for supporting positioning operations by the at least one of the femtocell transceivers in communication with the location server.

Another particular implementation is directed to an article comprising: a non-transitory storage medium comprising machine-readable instructions stored thereon which are executable by a special purpose computing apparatus of a mobile device to: determine a global unique identifier for the mobile device, the global unique identifier being recognizable by femtocell transceivers in a venue, the global unique identifier being determined independently of any public operator-defined globally unique identifier; initiate transmission of at least one message to a location server, the at least one message comprising the global unique identifier; and initiate transmission of one or more wireless signals which are acquirable by at least one of the femtocell transceivers for supporting positioning operations by the at least one of the femtocell transceivers in communication with the location server.

Another particular implementation is directed to an apparatus at a mobile device, comprising: means for determining a global unique identifier for the mobile device, the global unique identifier being recognizable by femtocell transceivers in a venue, the global unique identifier being determined independently of any public operator-defined globally unique identifier; means for transmitting at least one message to a location server comprising the global unique identifier; and means for transmitting one or more wireless signals which are acquirable by at least one of the femtocell transceivers to obtain the global unique identifier for supporting positioning operations by the at least one of the femtocell transceivers in communication with the location server.

Another particular implementation is directed to a method comprising, at a femtocell transceiver: acquiring one or more wireless signals transmitted from a mobile device to obtain a global unique identifier determined at the mobile device independently of any operator-defined globally unique identifier, and to obtain measurements of one or more characteristics of the one or more wireless signals; and transmitting one or messages comprising the one or more measurements and the global unique identifier to a location server for use in positioning operations.

Another particular implementation is directed to a femtocell transceiver comprising: a wireless receiver; a transmitter; and one or more processors to: obtain a global unique identifier from one or more wireless signals transmitted by a mobile device and acquired at the wireless receiver, the global unique identifier being determined at the mobile device independently of any operator-defined globally unique identifier; obtain measurements of one or more characteristic of the acquired one or more wireless signals; and initiate transmission of one or more messages through the transmitter comprising the one or more measurements and the global unique identifier to a location server for use in positioning operations.

Another particular implementation is directed to an article comprising: a non-transitory storage medium comprising machine-readable instructions stored thereon which are executable by a special purpose computing apparatus of a femtocell transceiver to: obtain a global unique identifier from one or more wireless signals transmitted by a mobile device and acquired at the femtocell transceiver, the global unique identifier being determined at the mobile device independently of any operator-defined globally unique identifier; obtain measurements of one or more characteristic of the acquired one or more wireless signals; and initiate transmission of one or more messages comprising the one or more measurements and the global unique identifier to a location server for use in positioning operations.

Another particular implementation is directed to an apparatus at a femtocell transceiver comprising: means for acquiring one or more wireless signals transmitted from a mobile device to obtain a global unique identifier determined at the mobile device independently of any operator-defined globally unique identifier, and to obtain measurements of one or more characteristics of the one or more wireless signals; and means for transmitting one or messages comprising the one or more measurements and the global unique identifier to a location server for use in positioning operations.

Another particular implementation is directed to a method at a location server, comprising: receiving a first message from a mobile device comprising a global unique identifier for the mobile device, wherein the global unique identifier is recognizable by femtocell transceivers in a venue and is determined independently of any public operator-defined globally unique identifier; receiving a second message from a femtocell transceiver comprising the global unique identifier and one or more measurements obtained by the femtocell transceiver, wherein the one or measurements are of one or more characteristics of one or more wireless signals transmitted by the mobile device and comprising or being associated with the global unique identifier; and performing one or more positioning operations for the mobile device based, at least in part, on the one or more measurements.

Another particular implementation is directed to a location server, comprising: a communication interface; and one or more processors to: obtain a first message received at the communication interface from a mobile device comprising a global unique identifier for the mobile device, wherein the global unique identifier is recognizable by femtocell transceivers in a venue and is determined independently of any public operator-defined globally unique identifier; obtain a second message received at the communication interface from a femtocell transceiver comprising the global unique identifier and one or more measurements obtained by the femtocell transceiver, wherein the one or measurements are of one or more characteristics of one or more wireless signals transmitted by the mobile device and comprising or being associated with the global unique identifier; and perform one or more positioning operations for the mobile device based, at least in part, on the one or more measurements.

Another particular implementation is directed to an apparatus at a location server, comprising: means for receiving a first message from a mobile device comprising a global unique identifier for the mobile device, wherein the global unique identifier is recognizable by femtocell transceivers in a venue and is determined independently of any public operator-defined globally unique identifier; means for receiving a second message from a femtocell transceiver comprising the global unique identifier and one or more measurements obtained by the femtocell transceiver, wherein the one or measurements are of one or more characteristics of one or more wireless signals transmitted by the mobile device and comprising or being associated with the global unique identifier; and means for performing one or more positioning operations for the mobile device based, at least in part, on the one or more measurements.

Another particular implementation is directed to a non-transitory storage medium comprising machine-readable instructions stored thereon which are executable by a special purpose computing apparatus of a location server to: obtain a first message received from a mobile device comprising a global unique identifier for the mobile device, wherein the global unique identifier is recognizable by femtocell transceivers in a venue and is determined independently of any public operator-defined globally unique identifier; obtain a second message received from a femtocell transceiver comprising the global unique identifier and one or more measurements obtained by the femtocell transceiver, wherein the one or measurements are of one or more characteristics of one or more wireless signals transmitted by the mobile device and comprising or being associated with the global unique identifier; and perform one or more positioning operations for the mobile device based, at least in part, on the one or more measurements.

It should be understood that the aforementioned implementations are merely example implementations, and that claimed subject matter is not necessarily limited to any particular aspect of these example implementations.

DETAILED DESCRIPTION

GPS and other like satellite positioning systems (SPSs) have enabled location based services for mobile handsets in outdoor environments such as navigation services, direction finding, child and friend finding and location for emergency calls, to name just a few examples. Since satellite signals may not be reliably received and/or acquired in an indoor environment, different techniques may be employed to enable location based services indoors. Such techniques may employ measurements of terrestrial radio signals by a mobile device such as signals transmitted by cellular base stations and Femtocells and/or by WiFi or Bluetooth® access points (APs). Such techniques may also or alternatively employ measurements by cellular base stations, Femtocells and/or WiFi and Bluetooth APs of signals transmitted by a mobile device. In particular implementations of an indoor positioning technique, a presence and location of a mobile device in an indoor venue may be detected, measured and/or tracked using a mobile centric (MC) approach or a network centric (NC) approach. In an MC approach, for example, a receiver at a mobile device may obtain measurements (e.g. of signals transmitted by an SPS, base stations, Femtocells and/or APs) for use in detecting a presence or measuring a location of the mobile device. In an NC approach, receivers at stationary network elements (e.g. base stations, Femtocells and/or APs) may acquire and measure signals transmitted by a mobile device for detection of a presence of the mobile device in a venue or other area and estimating or tracking a location of the mobile device in the venue or other area.

A mobile device capable of communicating wirelessly with other devices according to an IEEE standard 802.11x communication protocol may have a uniquely assigned Media Access Control (MAC) address. In a particular implementation of an NC positioning technique, a receiver (e.g., at an IEEE std. 802.11x AP) may identify a mobile device source of an acquired signal by demodulating the acquired signal to recover a MAC address uniquely assigned to the mobile device source. Based, at least in part, on measured attributes of the acquired signal (e.g., received signal strength indicator (RSSI) and/or round trip signal propagation time (RTT)), a network entity may compute an estimated location of the mobile device source. In a particular implementation of an MC positioning technique, a mobile device (e.g. capable of supporting IEEE std. 802.11x signaling) may receive signals from one or more source APs and may identify each source AP by demodulating the acquired signal from each source AP to recover a MAC address uniquely assigned to the source AP. Based, at least in part, on measured attributes of the acquired signals (e.g., RSSI and/or RTT), the MAC addresses of the source APs and information for the source APs (e.g. known locations of the source APs), the mobile device or a network entity to which the mobile device forwards the measurement, MAC address and other information may compute an estimated location of the mobile device.

Systems and techniques to support or enable indoor positioning are currently being specified by the In Location Alliance (ILA), the Open Mobile Alliance (OMA) and by other standards based organizations. In the case of ILA specifications, use of WiFi (e.g. IEEE 802.11x capable) APs and Bluetooth (BT) APs provide the principal means of measuring accurate location of a mobile device in an indoor environment (e.g., using MC or NC positioning techniques as described above). Femtocells (also known as Home Base Stations and Small Cells) could potentially also be used in deployments for indoor positioning but are not an explicit part of the ILA reference model. However, there is a potential benefit to using femtocells for indoor positioning instead of or in addition to WiFi and BT APs since femtocells may enable indoor location based services in venues and other areas where femtocells are deployed but few or no WiFi and BT APs. However, incorporating femtocells as part of the ILA reference model may introduce several challenges or shortcoming such as: (1) a lack of a global mobile device address or ID visible to a femtocell (similar to a WiFi MAC address which is visible to WiFi APs but not to femtocells); (2) inability to broadcast positioning assistance data (AD) from a femtocell to nearby mobile devices; (3) inability for mobile devices to measure RTT to a femtocell accurately; (4) lack of an interface and associated positioning protocol between a femtocell and a venue location server (LS); and (5) lack of a means for a mobile device to access a venue intranet and entities within or accessible from a venue intranet (e.g. such as a location server or location based services application server) via a femtocell. Solutions to these problems could enable femtocells to be used to support indoor location of mobile devices using solutions and techniques enabled by the ILA reference model with similar or possibly even better performance than obtained using WiFi and BT APs. Particular implementations described herein are directed to methods and devices for integrating femtocells with local venue or other indoor based infrastructure within deployments based on the ILA reference model to, for example, enable providing location based services using the femtocells.

As shown by the architecture depicted in FIG. 1, in a particular implementation a mobile device 100 may transmit radio signals to, and receive radio signals from, a wireless communication network. In one example, mobile device 100 may communicate with a cellular communication network by transmitting wireless signals to, and/or receiving wireless signals from, a femtocell transceiver 110 over wireless communication link 123. Similarly, mobile device 100 may transmit wireless signals to, and/or receive wireless signals from, a local transceiver 115 over wireless communication link 125.

In a particular implementation, a local transceiver 115 may be configured to communicate with mobile device 100 at a similar range over wireless communication link 125 to the range enabled by a femtocell transceiver 110 over wireless communication link 123. For example, both a local transceiver 115 and a femtocell transceiver 110 may be positioned in an indoor environment. A local transceiver 115 may comprise a WiFi or BT AP and may provide access to a wireless local area network (WLAN, e.g., IEEE 802.11 network) or a wireless personal area network (WPAN, e.g., Bluetooth network). Of course it should be understood that these are merely examples of networks that may communicate with a mobile device over a wireless link, and claimed subject matter is not limited in this respect.

Examples of network technologies that may support wireless communication link 123 are Global System for Mobile Communications (GSM), Code Division Multiple Access 2000 (CDMA2000), Wideband Code Division Multiple Access (WCDMA), Long Term Evolution LTE), High Rate Packet Data (HRPD). GSM, WCDMA and LTE are technologies defined by an organization known as the $3^{rd}$ Generation Partnership Project (3GPP). CDMA2000 and HRPD are technologies defined by an organization known as the $3^{rd}$ Generation Partnership Project 2 (3GPP2). A femtocell transceiver 110 may comprise equipment providing access to particular subscribers to a wireless telecommunication network for a service (e.g., under a service contract) and may then be known as a Home Base Station, Home Node B (HNB) or Home eNodeB (HeNB). A femtocell transceiver 110 may alternatively provide access to many or even all subscribers to a wireless telecommunication network for different services (e.g., under different service contracts) and may then be known as a small cell. In each case, a femtocell transceiver 110 may perform functions of a cellular base station in servicing subscriber devices within a cell determined based, at least in part, on a range at which the femtocell transceiver 110 is capable of providing access service. In a particular implementation (and as discussed later herein with specific example implementations in FIGS. 5 and 6), a femtocell transceiver 110 may be connected to a carrier network via an Internet service provider (ISP) network (e.g., through a cable or DSL modem). A femtocell transceiver may also be referred to herein as just a "femtocell." Examples of radio technologies that may support wireless communication link 125 are IEEE 802.11 or BT.

In a particular implementation, femtocell transceiver 110 and local transceiver 115 may communicate with servers 140, 150 and/or 155 over a network 130 through links 145. Here, network 130 may comprise any combination of wired or wireless links and may include femtocell transceiver 110 and/or local transceiver 115 and/or servers 140, 150 and 155. In a particular implementation, network 130 may comprise Internet Protocol (IP) infrastructure capable of facilitating communication between mobile device 100 and servers 140, 150 or 155 through local transceiver 115 or femtocell transceiver 110. In another implementation, network 130 may comprise cellular communication network infrastructure such as, for example, a base station controller or packet based or circuit based switching center (not shown) to facilitate mobile cellular communication with mobile device 100. In a particular implementation, network 130 may comprise local area network (LAN) and/or WLAN elements such as WiFi APs, routers and bridges and may in that case include or have links to gateway elements that provide access to wide area networks such as the Internet. In other implementations, network 130 may comprise a LAN or WLAN and may or may not have access to a wide area network but may not provide any such access (if supported) to mobile device 100. A network 130 that includes LAN and/or WLAN elements and that provides communication and/or location services within a venue may be referred to as a venue intranet. In some implementations network 130 may comprise multiple networks (e.g., one or more wireless networks and/or the Internet).

In particular implementations, and as discussed below, a mobile device 100 may have circuitry and processing resources capable of computing a position fix or estimated location of mobile device 100. In the presently illustrated example, mobile device 100 may obtain a position fix by measuring signals received from terrestrial transmitters fixed at locations that may be known (e.g., such as femtocell transceiver 110 and/or local transceiver 115) using any one of several position methods such as, for example, Advanced Forward Link Trilateration (AFLT), Observed Time Difference Of Arrival (OTDOA), Enhanced Cell ID (E-CID) or RF pattern matching. In the case of AFLT and OTDOA, a location of mobile device 100 may be determined from pseudoranges or timing differences that may be measured by mobile device 100 for three or more of such terrestrial transmitters fixed at known locations based, at least in part, on pilot signals, positioning related signals or other signals transmitted by the terrestrial transmitters and received at mobile device 100. In the case of E-CID and RF pattern matching, a location of mobile device 100 may be obtained from measurements made by mobile device 100 of (i) signal strengths (e.g. RSSI) for signals received from femtocell transceiver 110 and/or local transceiver 115 and/or (ii) the RTT between mobile device 100 and each transceiver.

To support positioning techniques such as AFLT, OTDOA, E-CID and RF pattern matching, one or more of servers 140, 150 or 155 may be capable of providing positioning assistance data to mobile device 100 including, for example, information regarding signals to be measured (e.g., signal timing) and locations and identities of terrestrial transmitters. For example, one or more of servers 140, 150 or 155 may comprise an almanac which indicates (i) locations and identities of femtocell transceivers 110 and/or local transceivers 115 in a particular area or areas such as in a particular venue, and/or (ii) information descriptive of signals transmitted by femtocell transceivers 110 and/or local transceivers 115 in a particular area or areas such as transmission power, signal timing and/or expected RSSI and/or RTT at different grid locations within the coverage area of any femtocell transceiver 110 or local transceiver 115. One of location servers 140, 150 or 155 may provide some or all of the almanac information to mobile device 100 to assist mobile device 100 to measure signals from femtocell transceivers 110 and/or local transceivers 115 and determine a location of mobile device 100 from the measurements. In some other implementations, mobile device 100 may make measurements of femtocell transceivers 110 and/or local transceivers 115 and may in some cases receive almanac information from server 140, 150 or 155 to assist making the measurements but may transfer the resulting measurements to one of servers 140, 150 or 155 to determine a location of mobile device 100 (e.g. where determining the location is based on the transferred measurements and almanac information available to the server).

A mobile device (e.g. mobile device 100 in FIG. 1) may be referred to as a device, a wireless device, a mobile terminal, a terminal, a mobile station (MS), a user equipment (UE), a Secure User Plane Location (SUPL) Enabled Terminal (SET) or by some other name and may correspond to a cellphone, smartphone, laptop, tablet, PDA, tracking device or some other portable or moveable device. Typically, though not necessarily, a mobile device may support wireless communication such as by using GSM, WCDMA, LTE, CDMA2000, Universal Mobile Telecommunications System (UMTS), HRPD, WiFi, BT, WiMAX etc. A mobile device may also support wireless communication using a WLAN and may then access other networks and remote entities (e.g. including network 130 and one or more of servers 140, 150 and 155) via a DSL or packet cable link from the WLAN to an ISP gateway. A mobile device may comprise a single entity or may comprise multiple entities such as in a personal area network where a user may employ audio, video and/or data I/O devices and/or body sensors and a separate wireline or wireless modem. The location of a mobile device (e.g., mobile device 100) may be referred to as a location estimate, location fix, position, position estimate or position fix and may be geographic and thereby provide location coordinates for the mobile device (e.g., latitude and longitude) which may or may not include an altitude component (e.g., height above sea level, height above or depth below ground level, floor level or basement level). Alternatively or in addition, a location of a mobile device may be expressed as a civic location (e.g. as a postal address or the designation of some point or small area in a building such as a particular room or floor). A location of a mobile device may also be expressed as an area or volume (defined either geographically or in civic form) within which the mobile device may be expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise. Information related to a location estimate such as (i) a location estimate itself, (ii) location related measurements (e.g. measurements of RTT or RSSI) from which a location estimate may be derived or (iii) presence or absence in a particular area or at a particular location may be referred to synonymously as "location information", "location parameters", "location related information" or "location related parameters".

The network architecture described previously in relation to FIG. 1 may be considered as a generic architecture or framework that can fit a variety of outdoor and indoor location solutions including the SUPL user plane location solution defined by OMA and control plane location solutions for GSM, WCDMA, LTE and CDMA2000 defined by 3GPP and 3GPP2. For example, server 140, 150 or 155 may function as a SUPL location platform (SLP) to support the SUPL location solution or as an enhanced Serving Mobile Location Center (E-SMLC) to support the 3GPP control plane location solution for LTE access on wireless communication link 123 or 125. However, the framework exemplified in FIG. 1, when used to support location solutions as defined by 3GPP, 3GPP2 and OMA, may not always be effective to support location services in an indoor environment or mixed indoor and outdoor environment of particular venues in the case that the location servers 140, 150, 155 belong to a public network operator rather than a venue owner or venue manager. This may occur because the location servers 140, 150 and 155 may then lack detailed almanac data regarding the presence, locations and transmission characteristics of femtocells (e.g. femtocell 110) and local transceivers (e.g. local transceiver 115) inside one or more venues. Hence adaptations to the architecture shown in FIG. 1 and to the positioning methods that are supported may be needed as described further on herein.

In particular environments, mobile device 100, or a server 140, 150 or 155 to which mobile device 100 is able to provide measurements, may be capable of computing a position fix based, at least in part, on signals acquired and measured by mobile device 100 from local transmitters (e.g., local transceiver 115 or femtocell transceiver 110) positioned at known locations. For example, a mobile device 100 may obtain a position fix by measuring ranges to three or more APs which are positioned at known locations. Such ranges may be measured, for example, by obtaining a MAC address from signals received from each AP and by obtaining range measurements to each AP by measuring one or more characteristics of signals received from each AP such as, for example, RSSI or RTT. In alternative implementations, mobile device 100, or a server 140, 150 or 155 to which mobile device 100 can transfer measurements, may obtain an indoor position fix using RF pattern matching by applying characteristics measured by mobile device 100 of signals acquired from nearby APs to a radio map indicating expected RSSI and/or RTT values for any particular AP at particular locations in an indoor area (e.g. at grid locations spaced 1 meter apart in the radio coverage area of the AP within the indoor area). In particular implementations, a radio map may be associated with the identity of an AP (e.g., a MAC address which is discernible from a signal acquired from the AP) and may provide expected RSSI values for signals transmitted by the AP, expected RTT values, and/or standard deviations from the expected RSSI and/or RTT values. RF pattern matching may comprise finding a location where expected signal characteristics given by a radio map most closely match measured signal characteristics and may be performed by mobile device 100 or by one of location servers 140, 150 or 155. In alternative implementations, measurements of angles of signal arrival or departure may be used in lieu of or in combination with measurements of range or RF pattern matching for estimating a location of a mobile device.

In particular implementations, mobile device 100 may receive positioning assistance data for indoor positioning operations from one or more of servers 140, 150 or 155. For example, such positioning assistance data may include locations and identities of transmitters (e.g., femtocell transceiver 110 and/or local transceiver 115) positioned at known locations to enable positioning of mobile device 100 based on measuring ranges to these transmitters using measured RSSI and/or RTT, for example. Other positioning assistance data to aid indoor positioning operations may include radio maps, magnetic maps, routeability graphs, building layouts and floor plans indicating permitted locations, common locations and improbable locations (e.g. associated with walls and building infrastructure) just to name a few examples. Other positioning assistance data received by the mobile device 100 may include, for example, local maps of indoor areas for display or to aid in navigation. Such a map may be provided to mobile device 100 as mobile device 100 enters a particular indoor area. Such a map may show indoor features such as doors, hallways, entry ways, walls, etc., points of interest such as bathrooms, pay phones, room names, stores, etc. By obtaining and displaying such a map, a mobile device 100 may overlay a current location of the mobile device (and user) over the displayed map to provide the user with additional context.

In one implementation, a routeability graph and/or digital map may assist mobile device 100 in defining feasible areas for navigation within an indoor area and subject to physical obstructions (e.g., walls) and passage ways (e.g., doorways in walls). Here, by defining feasible areas for navigation, mobile device 100 may apply constraints to aid in the application of filtering measurements for estimating locations and/or motion trajectories according to a motion model (e.g., according to a particle filter and/or Kalman filter). In addition to measurements obtained from the acquisition of signals from local transmitters, according to a particular embodiment, mobile device 100 may further apply a motion model to measurements or inferences obtained from inertial sensors (e.g., accelerometers, gyroscopes, magnetometers, compass, etc.) and/or environment sensors (e.g., temperature sensors, microphones, barometric pressure sensors, ambient light sensors, camera imager, etc.) in estimating a location, change of location or motion state of mobile device 100.

According to an embodiment, mobile device 100 may access indoor location assistance data through servers 140, 150 or 155 by, for example, requesting the indoor assistance data through selection of a universal resource locator (URL). In particular implementations, servers 140, 150 or 155 may be capable of providing indoor location assistance data to cover many different indoor areas including, for example, floors of buildings, wings of hospitals, terminals at an airport, portions of a university campus, areas of a large shopping mall, just to name a few examples. Also, memory resources at mobile device 100 and data transmission resources may make receipt of indoor location assistance data for all areas served by servers 140, 150 or 155 impractical or infeasible. A request for indoor location assistance data from mobile device 100 may then indicate a rough or course estimate of a location of mobile device 100. Mobile device 100 may then be provided with indoor location assistance data covering areas including and/or proximate to the rough or course estimate of the location of mobile device 100 which may reduce the memory requirements of mobile device 100 and use of data transmission resources while still providing mobile device 100 with valuable location assistance data.

In a particular implementation, an access network (AN) or an access location network (ALN) may comprise devices capable of wireless transmission and/or reception positioned and configured to transmit or receive signals to assist in positioning operations such as, for example local transceivers 115 or femtocell transceivers 110 described above. Signals transmitted and received to assist in positioning operations may be designed primarily to support communication of audio, video, data and control information as part of normal communications operations but may provide the additional benefit of supporting positioning by having measurable attributes such as signal strength, signal angle of arrival (AOA), signal timing or other signal characteristics. Relating to an AN or ALN, an AN database or ALN database (ALN DB), respectively, may be maintained in a server such as server 140, 150 or 155. Similarly, entities such as a location based services application server (LBS AS), location server (LS), map database (Map DB) and privacy policy database (PPD) may be provided or maintained by one or more of servers 140, 150 or 155. Typical functions of each of these entities are described later herein. In addition, a mobile station (MS) may be detected in a venue and may interact with one or more of the above referenced entities over wireless communication links. In one example, an MS may be implemented as a mobile device 100 discussed above. In particular examples, an MS may comprise circuitry or processors for hosting one or more applications capable of communicating with one or more of the aforementioned elements in performing location based services.

In implementations that use SUPL as a location solution, a location server such as server 140, 150 or 155 in FIG. 1 may comprise a home SLP (H-SLP) or a discovered SLP (D-SLP) for mobile device 100. An H-SLP may be provided for mobile device 100 by a home wireless network operator or by some other preferred location provider, and may comprise a location server with which mobile device 100 is provisioned to receive location services (using SUPL) while in a home area (e.g., home network coverage area) or while unable to obtain location services from some other location server if not in a home area. A D-SLP may comprise a location server supporting location services in some limited area such as a particular building, a venue, a city, a state or some foreign country for a user and may have unique data (e.g., unique positioning assistance data that can be transmitted to mobile device 100) to support location services in this area. A D-SLP may support better location services (e.g., may enable more accurate and reliable location) than an H-SLP inside the area served by the D-SLP. It may then be an advantage for mobile device 100 to discover a D-SLP while in certain environments, such as inside a venue, in order to obtain improved location services. Hence, a D-SLP may be used for SUPL location in any extension or modification of the architecture in FIG. 1 that is intended to support location services for a venue or other indoor environment.

According to an embodiment, SUPL may provide a location solution based on interaction between a SET and an SLP using TCP/IP as a transport mechanism in which SUPL messages, defined according to the SUPL User Plane Location Protocol (ULP) defined by OMA, are exchanged between a SET and an SLP to set up and manage SUPL location sessions and to transport positioning assistance data from an SLP to a SET, location information (e.g., a location estimate and/or measurements for use in computing a location estimate) from a SET to an SLP and SUPL and positioning capabilities from a SET to an SLP and/or from an SLP to a SET. A SUPL session may employ one or more positioning protocols that may convey at least a portion of positioning assistance data transferred from an SLP to a SET and some or all of the location measurement and/or location estimate information transferred from the SET to the SLP. Certain SUPL messages (e.g., a SUPL POS message) may carry one or more embedded messages defined according to a positioning protocol as a means of supporting positioning within a SUPL session. Examples of positioning protocols supported by SUPL include Radio Resource Location Services (LCS) Protocol (RRLP), Radio Resource Control Protocol (RRC), LTE Positioning Protocol (LPP), IS-801 and LPP Extensions (LPPe). Typically, LPPe may extend LPP such that an LPP positioning protocol message may contain an embedded LPPe message. If LPPe is used to extend LPP, the combined protocol may be referred to as LPP/LPPe. RRLP, RRC and LPP are defined by 3GPP, IS-801 is defined by 3GPP2 and LPPe is defined by OMA, all in publicly available documents.

Figure 2:
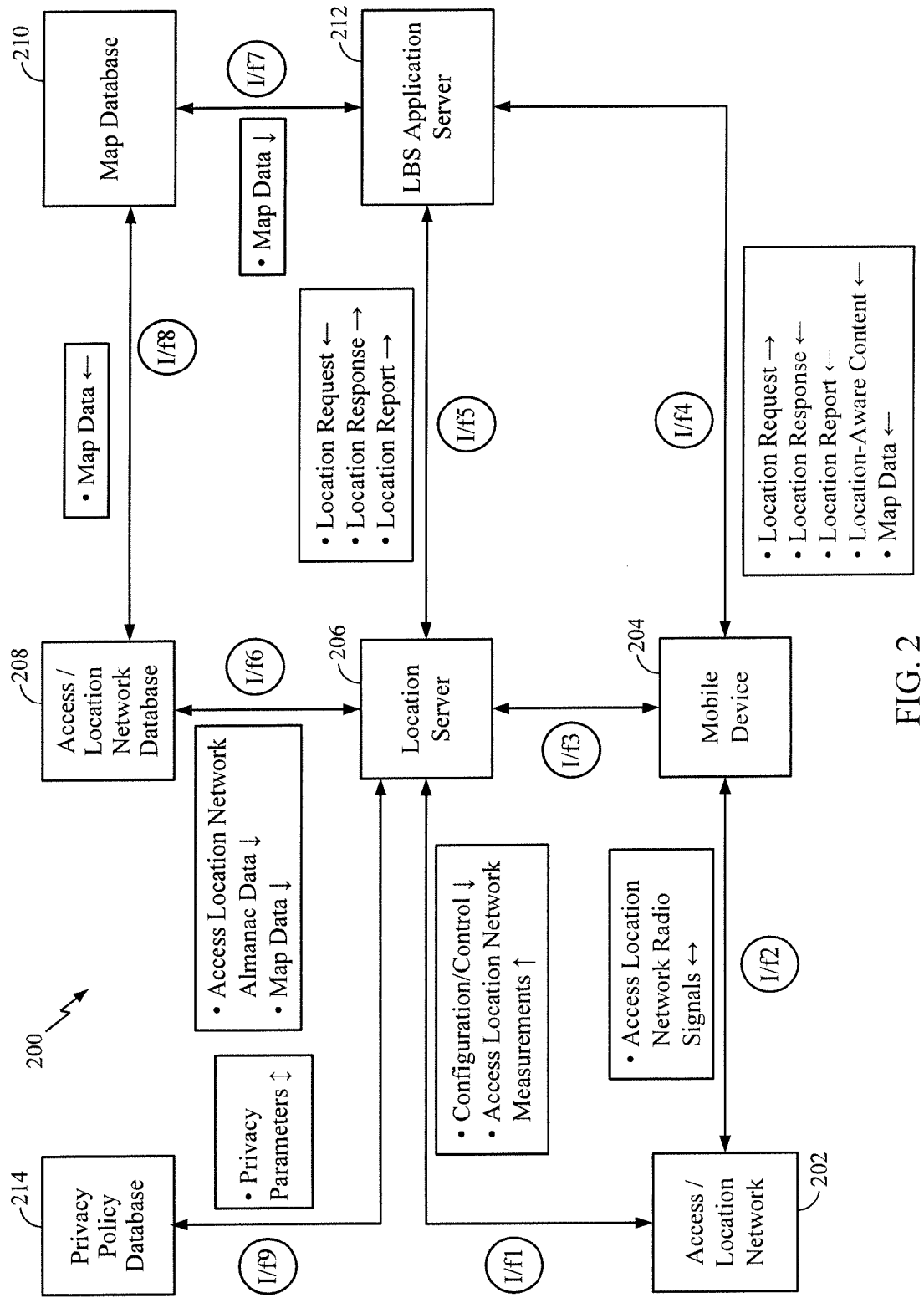
FIG. 2 is a system diagram illustrating certain features of an architecture for providing location based services in a venue according to an example embodiment.

FIG. 2 is a schematic diagram of an architecture 200 to provide location based services in a venue or other area according to an embodiment. Architecture 200 may be seen as an extension or modification of the architecture in FIG. 1 that is suitable for supporting location in indoor areas such as a venue and may be implemented using elements of the architecture shown in FIG. 1. For example, mobile device (MD) 204 in FIG. 2 may be implemented as mobile device 100 in FIG. 1. Location server (LS) 206, access/location network database (ALN DB) 208, map database (map DB) 210, location based services application server (LBS AS) 212, location server (LS) 206 and privacy policy database (PPD) 214 may each be implemented as, or as a part of, servers 140, 150 and/or 155 in FIG. 1. Access/location network (ALN) 202 may be implemented, at least in part, by femtocell transceivers 110 and/or local transceivers 115 in FIG. 1 and/or similar transceivers that serve a venue or other area of interest. ALN 202 may comprise entities whose primary or only role is to support locating mobile devices such as mobile device 204 (e.g. by transmitting positioning related radio signals to be measured by mobile device 204 and/or by measuring radio signals transmitted by mobile device 204) as well as entities whose primary or only role is to facilitate communication between mobile devices, such as mobile device 204, and other entities including but not limited to entities in FIG. 2 such as LS 206 and LBS AS 212.

LS 206 may (e.g., if requested) determine location related parameters (e.g., a location estimate or presence in a particular area) for mobile devices (e.g. MD 204) and may provide these location parameters to other entities such as the mobile device to which the location information applies (e.g., MD 204) or other entities (e.g., LBS AS 212). LS 206 may also provide location assistance data to mobile devices (e.g. MD 204) to assist mobile devices to make location related measurements and calculate their own estimated locations from these measurements. LS 206 may interact with a mobile device to determine the location of the mobile device or provide location assistance data to a mobile device. LS 206 may also or instead interact with ALN 202 to obtain location related parameters for one or more mobile devices (e.g., location measurements for mobile device 204 made by or obtained by devices in ALN 202). LS 206 may be an H-SLP or D-SLP in some embodiments. LBS AS 212 may support one or more LBS services on behalf of mobile devices (e.g., MD 204), external clients and/or owners, operators or managers of a network or venue. Such services may include provision of directions, navigation support, map data and/or other location related parameters to the users of mobile devices and provision of information about mobile devices (e.g., number of mobile devices in a certain area, dwell time of mobile devices in an area, location histories of mobile devices) to external clients and/or to venue or network owners or operators. To support LBS services, LBS AS 212 may request and obtain location parameters for particular mobile devices or any mobile device (e.g. MD 204) from LS 206. ALN DB 208 may store information related to devices (e.g. APs or femtocells) in ALN 202 such as almanac data that may include the location of each device (e.g., latitude, longitude and possibly altitude), its wireless characteristics (e.g. wireless technologies supported), antenna characteristics and transmission characteristics (e.g., transmission power, transmission timing). ALN DB 208 may provide information (e.g., concerning ALN 202) to a location server (e.g., LS 206) when requested and/or when certain conditions arise (e.g. availability of new information) to assist the location server to provide location assistance data to mobile devices and/or to determine location or presence information for mobile devices (e.g., determine a location for MD 204 from measurements related to MD 204 provided by ALN 202 and/or MD 204). Map DB 210 may store maps and map related information (e.g., layout of stores in a shopping mall) for a certain area (e.g., a venue, town, city, building) and may provide some of this information (e.g., if requested) to LBS AS 212 and/or to ALN DB 208. LBS AS 212 may user the information received from Map DB 210 to provide LBS services to mobile devices (e.g., MD 204). ALN DB 208 may user the information received from Map DB 210 to enhance the information that ALN DB 208 is able to provide to a location server (e.g., LS 206) and/or to enable ALN DB 208 to infer or calculate information related to ALN 202 such as calculating the signal strength expected to be received from a femtocell transceiver 110 in ALN 202 at different locations in the coverage area of the femtocell transceiver in a building or venue. PPD 214 may support services related to privacy—e.g. may restrict the types of location information that can be provided to other entities for certain mobile devices and/or certain devices in ALN 202.

In particular implementations, a presence and/or location of mobile device 204 in a venue or other indoor environment may be detected, measured or tracked using the aforementioned MC positioning approach and/or the aforementioned NC positioning approach. In an MC positioning approach, for example, a receiver at mobile device 204 may obtain measurements for use in detecting a presence or estimating a location of mobile device 204. In an NC positioning approach, receivers at stationary network elements (e.g., elements of ALN 202) may acquire signals transmitted by mobile device 204 for detection of a presence of mobile device 204 in a venue and estimating or tracking a location of mobile device 204 in the venue. LS 206 may employ network centric and/or mobile centric positioning depending on capabilities of mobile device 204, ALN 202 and LS 206. LBS AS 212 may also query mobile device 204 for its location if LS 206 and/or ALN 202 do not support network centric positioning, or if mobile device 204 provides an estimate of its location more accurately, more quickly and/or more efficiently. Also, measurements indicated herein as being obtained using MC and NC positioning approaches may be combined (e.g., at an LS) to mitigate measurement errors and improve accuracy and reliability of position estimates.

Message interfaces between entities in architecture 200 may include message interfaces i/f 1 through i/f 9 as indicated in FIG. 2. The types of messages (and other types of non-message data such as packets, bit sequences, chip sequences) that may be transferred on each interface are also shown in FIG. 2 with an arrow shown for each type of message (or other type of data) that indicates a possible direction of transfer for the message (or other type of data) that may be just one direction (shown using a single headed arrow) or both directions (shown using a double headed arrow). As shown by the arrows, message interfaces i/f 1 through i/f 9 may be bi-directional or uni-directional for different types of messages (or other types of data). Message interfaces i/f 1 through i/f 9 may be implemented on any suitable communication link infrastructure such as Internet protocol (IP) infrastructure, wireless communication links, a local area network (LAN), just to provide a few examples. Message interfaces i/f 7 and i/f 8 may transmit requested map data from Map DB 210 to LBS AS 212 and ALN DB 208, respectively, for example in response to requests from these entities. Message interface i/f 4 may transmit location aware content or map data from LBS AS 212 to mobile device 204. Message interface i/5 5 may transmit a location request message from LBS AS 212 to LS 206, and a location response or location report message from LS 206 to LBS AS 212 in response to the location request message. In an MC positioning approach, message interface i/f 4 may similarly transmit a location request message from LBS AS 212 to mobile device 204, and a location response or location report message from mobile device 204 to LBS AS 212 in response to the location request message. In an NC positioning approach, on the other hand, message interface i/f 4 may transmit a location request message from mobile device 204 to LBS AS 212, and a location response or location report message from LBS AS 212 (which may convey a location estimate for mobile device 204 obtained by LBS AS 212 from LS 206) to mobile device 204 in response to the location request message.

Message interface i/f 3 may be used in an MC positioning approach and may transmit positioning assistance data from LS 206 to mobile device 204. In a particular implementation where mobile device 204 computes an estimate of its location (e.g., using one or more of the previously described positioning techniques), message interface i/f 3 may transmit the computed location estimate from mobile device 204 to location server 206. In another implementation, message interface i/f 3 may transmit access network related measurements (which may be obtained by mobile device 204 and/or obtained by ALN 202 and conveyed to mobile device 204) from mobile device 204 to LS 206, and/or transmit an estimated location of mobile device 204 (e.g., computed based, at least in part on the access network related measurements) from LS 206 to mobile device 204. Such access network related measurements may include, but are not necessarily limited to, the aforementioned measurements of RTT, RSSI and angles of arrival for (i) signals transmitted by mobile device 204 and received and measured by ALN 202 and/or (ii) signals transmitted by ALN 202 and received and measured by mobile device 204.

Message interface i/f 2 (which may comprise a wireless signal interface and not explicitly convey messages) may transmit messages and/or radio signals between ALN 202 and mobile device 204 on wireless access communication links, for example. Any radio signals transmitted on message interface i/f 2 may be measured by a recipient entity and/or may initiate a response that may be measured by the initial sending entity in order to obtain RSSI, RTT, pseudoranges, timing differences, angles of arrival or other measurements that may enable location aspects (e.g. location coordinates) of mobile device 204 and/or of elements of ALN 202 (e.g., an AP or femtocell in ALN 202) to be obtained. Message interface i/f 2 may also transmit positioning assistance data that is broadcasted or unicasted from ALN 202 to mobile device 204, wherein the positioning assistance data may be obtained by ALN 202 from LS 206 or may otherwise be provisioned in ALN 202 (e.g., by a network management entity not shown in FIG. 2).

Message interface i/f 1 may be used in an NC positioning approach and may transmit messages from LS 206 to ALN 202 including, for example, messages to configure ALN 202 to detect and obtain measurements from mobile devices (e.g., MD 204) in the coverage area of ALN 202 (e.g., which may coincide with a venue) and to provide positioning assistance data to elements in ALN 202 for use by ALN 202 (e.g., to locate mobile device 204) or to be conveyed to mobile device 204 (e.g., via broadcast or unicast). In a network centric application, message interface i/f 1 may also transmit measurements from ALN 202 to LS 206 to, for example, enable LS 206 to detect, or compute an estimated location of, mobile devices in a venue.

In some implementations, LS 206 may communicate directly with individual APs and femtocells in ALN 202 using message interface i/f 1. In other implementations, LS 206 may communicate with one or more intermediate entities in ALN 202 using message interface i/f 1 such as an ALN controller or router. For the latter implementations, an intermediate entity may forward communication received from LS 206 to individual APs and Femtocells in ALN 202 and may similarly forward communication received from individual APs and Femtocells in ALN 202 to LS 206. In some cases, an intermediate entity may also enhance communication—for example, by combining information received from several or many APs and Femtocells before forwarding to LS 206, simplifying and filtering information received from LS 206 before forwarding to APs and Femtocells in ALN 202 and routing communication received from LS 206 to appropriate APs and Femtocells.

Message interface i/f 6 may transmit messages from ALN DB 208 to LS 206 which may convey positioning assistance data including base station almanac data for ALN 202 to LS 206 (e.g. which may assist LS 206 to position mobile devices and/or send assistance data to mobile devices). Message interface i/f 6 may also transmit crowdsourced data from LS 206 to ALN DB 208. The crowdsourced data may include measurements and other data related to locations, identities and transmission characteristics for access points (e.g., IEEE 802.11 access points) and/or femtocells in ALN 202 collected by LS 206 from client mobile devices such as mobile device 204 in a venue or other area.

In particular implementations, devices in ALN 202 (e.g., IEEE 802.11 access points, femtocell transceivers or Bluetooth devices) may be configured by LS 206 using message interface i/f 1 to detect and report the presence or location of mobile device 204 in a venue. For example, LS 206 may configure devices to detect and report on detected mobile devices entering a venue in a default mode (e.g., report on locations of all detected mobile devices every 30 seconds). LS 206 may configure devices to report on specific mobile devices in other modes (e.g., report at a lower or higher frequency if, for example, specific predefined trigger conditions occur such as some change in measured signal RTT or RSSI, for example).

Message interface i/f 9 may be used by LS 206 to query PPD 214 for privacy requirements related to locating a mobile device 204 and/or conveying a location of mobile device 204 to another entity such as LBS AS 212. Message interface i/f 9 may also or instead be used by PPD 214 to convey privacy rules and requirements for one or more mobile devices to LS 206 for usage by LS 206 at a later time. For example, privacy rules and requirements may be transferred to LS 206 in response to a change in these rules and requirements (e.g. as configured in PPD 214 by a network management system, not shown in FIG. 2).

In particular implementations, LBS AS 212 may configure LS 206 to report on newly detected mobile devices (e.g., as reported to LS 206 by ALN 202) in a default mode (e.g., report on all mobile devices every 30 seconds). LBS AS 212 may also configure LS 206 to provide reports for specific mobile devices or for all mobile devices in response to other trigger conditions. Trigger conditions and trigger detection may be implemented within LS 206 including complex trigger conditions such as detecting when a mobile device enters or leaves a specific portion of a venue (e.g. a particular shop in a shopping mall or a particular gate area in an airport) or detecting when a mobile device has moved a certain distance from some previously reported location. LS 206 may in turn configure some trigger conditions in ALN 202 and/or in mobile device 204 which may then report back to LS 206 data associated with these trigger conditions (e.g., detection of mobile device 204) entering a venue or periodic location of mobile device 204. However, in some implementations, LS 206 may support more complex trigger conditions while delegating the handling of simpler trigger conditions to ALN 202 and/or mobile device 204 in order to (i) reduce resource usage in ALN 202 and/or mobile device 204, (ii) conserve battery life in mobile device 204 and possibly ALN 202, (iii) simplify implementation (and possibly cost) of ALN 202 and/or mobile device 204 and/or (iv) avoid frequent upgrades to and replacement of elements in ALN 202 and mobile device 204. Possible configured triggers in LS 206, ALN 202 and mobile device 204 may include, for example, a single mobile device entering, leaving or remaining within a geofence (which may comprise some defined fixed area or some non-fixed area defined relative to the current location of another mobile device), a minimum or maximum number of mobile devices entering, leaving or remaining within a geofence, the presence and/or location of a mobile device or set of mobile devices during a specific time window or at a specific time, just to provide a few examples.

Mobile device 204 may be detected entering a certain area (e.g. a venue area) by one or more elements in ALN 202 (e.g., access points (APs) using existing low level IEEE 802.11 or Bluetooth (BT) signaling, or femtocell transceivers using cellular service signaling). For example, APs in ALN 202 may be configured to make measurements of signals transmitted by particular mobile devices expected to be in a certain area or of all mobile devices that can be detected in a certain area. Here, APs in ALN 202 may transmit messages to LS 206 (e.g., messages specifying a MAC address for a detected mobile device 204 and optional measurements of signals received from mobile device 204). LS 206 may then compute an estimated location for mobile device 204 and store the location and other data such a time of day and MAC address for mobile device 204 and/or report this data to LBS AS 212. For any particular mobile device of interest, LS 206 may maintain an identity (e.g., identifiers such as MAC address, IP address), last known location, location history, current heading and speed, last serving AP or mobile device capabilities. In one particular implementation in which interaction between LS 206 and mobile device 204 is defined, at least in part, according to OMA SUPL, capabilities of mobile device 204 may include being capable of executing certain positioning protocols such as LPP and LPPe and certain positioning methods such as A-GNSS, OTDOA, AFLT and/or E-CID. LS 206 may transfer information regarding mobile devices detected in a certain area (e.g., from contents of messages received from mobile devices or ALN 202) to LBS AS 212 (e.g., if configured for this as discussed above). LBS AS 212 may also store information received from LS 206 for use in, for example, delivery of location aware content to mobile devices (e.g. mobile device 204) and/or maintaining, developing or updating analytics data regarding visitors to a venue.

In a particular implementation, mobile device 204 may discover LBS AS 212 using any one of several techniques such as, for example: (i) an application hosted on mobile device 204 obtaining a URL or IP address for the LBS AS 212 via broadcast information received from ALN 202; (ii) a user downloading a dedicated application to be hosted on mobile device 204 that is configured in advance to interact with LBS AS 212 for one or more venues of other areas as soon as the application is notified (e.g. via user input) that a particular venue or other area has been detected by mobile device 204 or by the user of mobile device 204; or (iii) a user accessing LBS AS 212 via a user interface browser (e.g., by accessing a venue specific website) in response to the user being aware of being inside a particular venue or other area. For any particular such technique for discovering LBS AS 212, a user may initiate communication from mobile device 204 to LBS AS 212 via interaction with either an application hosted on mobile device 204 or via a mobile device browser or by other means. In a particular implementation, mobile device 204 and LBS AS 212 may interact in order to: (i) obtain and authenticate the identity of mobile device 204 by LBS AS 212, (ii) obtain and authenticate the identity (e.g. of a venue owner or operator) for LBS AS 212 by mobile device 204, (iii) provide LBS AS 212 with one or more identities or addresses of mobile device 204 (e.g., IP address, MAC address, International Mobile Subscriber Identity (IMSI), public user SIP address, logon identity or billing related identity), (iv) indicate to the user or an application hosted on mobile device 204 services (e.g., including location based services) that are available from the LBS AS 212 to mobile device 204, (v) provide user permission for mobile device 204 being located (e.g., in association with provision of certain agreed services), (vi) provide some initial map data to mobile device 204, (vii) provide an address of LS 206 to mobile device 204 (e.g., if not broadcast by elements of ALN 202, or available from an H-SLP or D-SLP known to mobile device 204), and/or (viii) provide location determination and positioning capabilities of mobile device 204 to LBS AS 212 (e.g. capabilities related to support of interface i/f 3 including possibly support of SUPL, LPP and LPPe on interface i/f 3). Following this interaction, LBS AS 212 may transmit messages to LS 206 providing information obtained from mobile device 204 such as an IP address, MAC address and/or other identity for mobile device 204, the capability of mobile device to support positioning related interaction (e.g. via SUPL) with LS 206 using interface i/f 3 and possibly an initial location for mobile device 204 if received by LBS AS 212 from mobile device 204. LBS AS 212 may also store attributes of mobile device 204 (e.g., identifiers, estimated location, location determination capabilities, etc.) to enable provisioning of agreed or preferred services and support future location determination requests. The interaction between LBS AS 212 and mobile device 204 described here may be associated with or facilitated by a registration of mobile device 204 with LBS AS 212 (e.g., which may be performed prior to mobile device 204 entering a venue or other area supported by LBS AS 212). Following such a registration, LBS AS 212 may maintain data for mobile device 204 even while mobile device 204 is not within a venue or other area supported by LBS AS 212. Such a registration may simplify and speed up the interaction just described between mobile device 204 and LBS AS 212 over message interface i/f 4 and may enable improved service support by LBS AS 212 to mobile device 204.

In a particular implementation, an estimated location of mobile device 204 may enable or help enable an application or browser hosted on mobile device 204 to support some service provided by a particular venue (e.g., provided by LBS AS 212 in FIG. 2) or some service provided independently of any particular venue. Here, for example, the browser or application hosted on mobile device 204 may request an estimate of a location of mobile device 204 using a suitable high level operating system (HLOS) application programming interface (API), which may lead to a request (e.g., from the HLOS) to a positioning engine or location engine on mobile device 204. A positioning engine or location engine may obtain an estimated location of mobile device 204 using various positioning methods such as A-GNSS, OTDOA, AFLT and/or use of WiFi AP and/or BT AP measurements and/or use of inertial sensors contained within mobile device 204 (e.g., accelerometers, gyroscopes, barometers, compass, etc.) which may entail interaction with an H-SLP and/or interaction with a venue D-SLP, for example (e.g., LS 206 in FIG. 2).

Positioning support in a venue may include discovery of an LS (e.g. a D-SLP) for a venue such as LS 206 by mobile device 204 or by a positioining engine in moibile device from (i) the H-SLP for mobile device 204, (ii) a D-SLP already discovered from and/or authorized by the H-SLP for mobile device 204 or (iii) information (e.g. a URL for LS 206) broadcast or unicast from APs and/or femtocells in ALN 202. Discovery of an LS such as LS 206 may be useful or necessary if a venue LS can provide better location support to mobile device 204 than an H-SLP or another D-SLP for mobile device 204. Here, if an application hosted on mobile device 204 interacts with LBS AS 212 in order to obtain location services (such as positioning assistance data and location related content data) in a venue or other area and this application relies on an estimated location of mobile device 204 in order to obtain or make use of such location services (e.g. to determine the location of mobile device 204 on a venue map provided by LBS AS 212), then the application may have an additional option of requesting an estimated location of mobile device 204 from LBS AS 212 (e.g., as a fallback to positioning engine failure or as a first choice if preferred by the application). In such a case, LBS AS 212 may request mobile device 204 location from LS 206 and LS 206 may request ALN 202 to perform network centric positioning of mobile device 204 with the location result or measurements being passed back from ALN 202 to LS 206 and with any computed location estimate then being passed back to mobile device 204 via LBS AS 212.

In a particular implementation, LBS AS 212 may request LS 206 to periodically locate some or all mobile devices (e.g., as described above). This may enable various services and/or collection of statistics on users in a venue or other area (e.g., in order to determine which shops are most popular in a shopping mall, where congestion occurs in an airport, where additional seating may be needed in a hospital). LS 206 may authenticate LBS AS 212 once only for multiple requests (e.g., may establish a secure session on which the multiple requests and their responses may be conveyed) or may authenticate LBS AS 212 for each individual request. LBS AS 212 may similarly authenticate LS 206 once only for multiple requests or for each individual request. LS 206 may request updated measurements from ALN 202 in order to obtain new location estimates for mobile devices of interest as discussed above and/or may rely on earlier configuration of ALN 202 by LS 206 whereby ALN 202 provides new location reports to LS 206 for mobile devices (e.g., mobile device 204) without the need for further requests from LS 206. LS 206 may also obtain location information (e.g. location estimates and/or location measurements) directly from mobile devices (e.g. mobile device 204) using interface i/f 3. LS 206 may then return obtained location information (e.g., location estimates, location history) for mobile devices such as mobile device 204 to LBS AS 212 to enable LBS AS 212 to provide location related services to these mobile devices.

In a particular implementation, a user (e.g., via an application or browser hosted on mobile device 204) may periodically request services (e.g., map data, venue information) from LBS AS 212. LBS AS 212 may also or instead periodically push services to the user without the need for a user request (e.g. via a browser or application hosted on mobile device 204) and as triggered by certain events (e.g., a user entering or leaving some geofence or following some change in environmental conditions). Mobile device 204 may obtain a position fix to make use of such services using a mobile centric approach or network centric approach as discussed above.

Following a timeout period following a last detection of mobile device 204 in a venue or other area by ALN 202 and/or after determination that a location of mobile device 204 is outside the venue or other area, LS 206 and LBS AS 212 may delete some or all stored attributes of mobile device 204 from their current data set. Here, in some instances, all data may be deleted in LS 206 while some data may be retained in LBS AS 212 (e.g., as agreed upon with the user and as allowed by a privacy policy that may be provided or verified by PPD 214). Retained data may, for example, be helpful to future authentication and billing support and for providing future services.

In particular implementations, as pointed out above, mobile device 204 may be registered with an LBS AS 212 where the LBS AS 212 has knowledge of a unique identifier (ID) of mobile device 204 (e.g. an IMSI, public SIP user ID, MAC address). Subsequent specific service requests issued by LBS AS 212 to LS 206 that may request location information (e.g., a location estimate) for mobile device 204 or that may configure LS 206 to provide such location information responsive to certain trigger events (such as mobile device 204 entering or leaving some geofence) may be specific to that particular unique ID (or may be specific to the IDs for a set of mobile devices if location information is needed for any mobile device or all mobile devices in a particular set). If a particular mobile device is not registered with LBS AS 212 (e.g., where a unique ID of the mobile device is not known by LBS AS 212), subsequent services requests by LBS AS 212 to LS 206 may be generic as opposed to specific to a particular unique ID of mobile device 204 and may then be applicable to any mobile device. For any generic or specific service request, LBS AS 212 may request that LS 206 respond to one or more particular types of predefined events. In one implementation, LBS AS 212 may request that LS 206 provide estimated locations of one or more identified mobile devices or of any mobile device at fixed times (e.g., periodically). In another implementation, LBS AS 212 may request that LS 206 report detections of an identified mobile device 204 or of any mobile device entering, leaving or remaining within a specific geographic target area. Such a particular report may comprise, for example, a simple event notification or may include more information such as, for example, an estimated location of mobile device 204 and/or an identity of mobile device 204. In another particular implementation in connection with ALN 202, LBS AS 212 may request that LS 206 report detection of an identified mobile device 204 or any mobile device entering or leaving an area covered or serviced by ALN 202. This particular report may comprise a simple event notification or may include more information such as, for example, an estimated location of the mobile device 204 and/or an identity of mobile device 204. In another particular implementation, LBS AS 212 may request that LS 206 provide reports in support of analytics (e.g., statistics on a rate of mobile devices that are detected entering and/or leaving a predefined area or statistics on the number of mobile devices detected within a predefined area). Here, LBS AS 212 may request that LS 206 provide a report in response to the occurrence of certain specific analytic events. For instance if a number of detected mobile devices (or the rate of detected arrivals and/or departures) within an area or ALN 202 exceeds a certain threshold, LS 206 may provide a report. Such a report may include a simple event notification or more information such as the location or locations of the mobile devices associated with the event and/or their identities. In order to provide location related event notifications and information to LBS AS 212, LS 206 may request location information from ALN 202 and/or mobile device 204, and/or may configure ALN 202 and/or mobile device 204 to provide location related event notifications and additional information to LS 206.

According to an embodiment a network operator or venue operator may be motivated to include femtocell transceivers as part of ALN 202 in addition to or in lieu of WiFi or Bluetooth transceiver devices. The cost of incorporating femtocells into an ALN that forms a private rather than a public network and serves a dedicated area such as a venue, building or campus may be subsidized by a public network operator in order to enable wide area communication for users in the dedicated area and reduce communication limitations (e.g. due to interference) as compared to communication enabled by alternative ALN devices such as WiFi APs. Deployment of femtocells as part of ALN 202 may also benefit a network operator by enabling increased network coverage and capacity inside a dedicated area, enabling reliable and accurate location of mobile devices in the dedicated area and allowing for additional revenue if the public network operator acts also as a provider of other services for the dedicated area such as location based services.

In particular implementations of incorporating femtocell transceivers as part of ALN 202, control and provision of portions of architecture 200 may be allocated differently between a public network operator and a private operator for a dedicated area such as an operator of a venue intranet or venue location service. In one particular implementation (referred to here as a model "A"), ALN 202 may be controlled/provided by a public network operator while LS 206, LBS AS 212, Map DB 210, ALN DB 208 and PPD 214 are controlled/provided by a private operator (e.g. a venue operator). Here, the public network operator may approve femtocell functionality incorporated into ALN 202 and subsidize femtocell deployment (e.g., where improved wireless coverage in a dedicated area caused by deployment of femtocells may provide an inducement for such a subsidy). This subsidy may lower the private operator's total cost. Furthermore, users in the dedicated area may then be able to access wide area network communication services including the ability to make and receive voice, data and/or video calls and access the Internet.

In another particular implementation (referred to here as a model "B"), ALN 202 and LS 206 may be controlled/provided by a public network operator while ALN DB 208, Map DB 210, LBS AS 212 and PPD 214 may be controlled/provided by a private operator. Here, the public network operator may become a provider of location based services within a dedicated area (and may charge a fee for such services) in addition to being a provider of communication services. In one aspect, LS 206 may be part of the public network operator infrastructure implemented as a SUPL location platform (SLP), E-SMLC, Standalone Serving Mobile Location Center (SAS) and/or position determining entity (PDE). In model B, interface i/f 1 may employ an existing protocol or an extension to an existing protocol that is standardized for use between a location server and devices in a AN or cellular Radio Access Network (RAN). Examples of such protocols include the LTE positioning protocol A (LPPa) defined in 3GPP Technical Specification (TS) 36.455 and the UTRAN Iupc interface Positioning Calculation Application Part (PCAP) protocol defined in 3GPP TS 25.453.

In another particular implementation (referred to here as a model "C"), ALN 202, LS 206 and ALN DB 208 may be controlled/provided by a public network operator while Map DB 210, LBS AS 212 and PPD 214 may be controlled/provided by a private operator. In this particular implementation, ALN DB 208 may be populated with (i) information provided to the public network operator by the private operator, (ii) location estimates derived from AP or femtocell transceiver self-location (e.g., using A-GNSS or other position methods supported by an AP or femtocell) and/or (iii) location estimates and/or other information for APs and Femtocells in ALN 202 derived by ALN DB 208 from information obtained from mobile devices that is provided using crowd sourcing to ALN DB 208 via LS 206.

In another particular implementation (referred to here as a model "D"), ALN 202, LS 206, ALN DB 208 and LBS AS 212 may be controlled/provided by a public network operator while Map DB 210 and PPD 214 may be controlled/provided by a private operator. In this particular implementation, the public network operator may provide and manage a complete location based services capability for a dedicated area on behalf of the private operator for this area except that the private operator may maintain control of map data (via the Map DB 210) and privacy requirements (via the PPD 214). The private operator may customize service details (e.g. details of location based services supported by LBS AS 212 and LS 206) and the public network operator may provide a common generic service or a set common generic services (e.g., one generic service for shops, another for hospitals, another for airports etc.) that include customizable parameters that a private operator can control in order to obtain a customized service. In this particular implementation, the public network operator may provide one or more applications for a mobile device 204 that can interact with LBS AS 212 in order to provide location based services (e.g. navigation, direction finding, directory assistance) to a user. In some implementations, LS 206, ALN DB 208, and LBS AS 212 may be located at central public network operator site and used to support location based services for multiple dedicated areas (e.g. multiple venues), thereby saving public network operator capital expenditure and operating costs.

In another particular implementation (referred to here as a model "E"), ALN 202, LS 206, ALN DB 208, LBS AS 212, Map DB 210 and PPD 214 may all be controlled/provided by a public network operator. This implementation may be supported similarly to model "D" but in addition, map data for Map DB 210 and privacy requirements for PPD 214 may need to be supplied to the public network operator by the owner or operator for a dedicated area such as by a venue owner or operator.

It is to be noted that while architecture 200 is shown as including only one ALN 202, one LS 206, one LBS AS 212, one Map DB 210, one ALN DB 208 and one PPD 214, there may be more than one of each of these elements supporting location services for or related to mobile devices in a venue or other local area. For example, a venue may have or have access to several LSs 206 which may each be load shared, used to support location for different subsets of mobile devices and/or used to support different type of positioning methods (e.g. with one LS 206 element supporting NC positioning and a different LS 206 element supporting MC positioning).

According to particular embodiments, additional features may improve or enhance the utility of a femtocell in indoor positioning operations. For example, a femtocell as an element of ALN 202 may be configured to broadcast assistance data (e.g. ALN almanac data) to mobile devices as part of a control message such as part of or an extension to a system information block (SIB) for LTE or WCDMA or using Multimedia Broadcast Multicast Services (MBMS). In another particular implementation, a femtocell as an element of ALN 202 may be configured to facilitate measurements of RTT to any mobile device. For example, new protocols or procedures using UMTS or LTE signaling may enable serving or non-serving femtocells to measure RTT to a mobile device, enable a mobile device to measure the RTT to the femtocell or provide improved support for OTDOA measurements by mobile devices for signals transmitted by femtocells.

As pointed out above, a mobile device capable of communicating wirelessly with other devices according to an IEEE std. 802.11x communication protocol may have a uniquely assigned MAC address. In a particular implementation of an NC positioning technique, a network receiver (e.g., at an IEEE std. 802.11x access point (AP)) may identify a mobile device source of an acquired signal by demodulating the acquired signal to recover a MAC address uniquely assigned to the mobile device source. Based, at least in part, on measured attributes of the acquired signal (e.g., RSSI or RTT) and possibly using similar information obtained by other network receivers, a network entity (e.g. a location server such as LS 206) may compute an estimated location of the mobile device source. This location determination may be possible even when a mobile device does not have an association with a network (e.g. is in non-associated mode with respect to ALN 202). However a femtocell transceiver may not necessarily be able to uniquely identify a mobile device source of signals acquired at the femtocell transceiver based solely on parameters or indications provided as part of a communication protocol that is explicitly supported by the femtocell. This may prevent determination of the location of a mobile device using measurements made by femtocells in situations where a mobile device is not attached to a network (e.g. not attached to ALN 202) and thus not known to a network. To remedy this deficiency, one or more protocols that are explicitly supported between a femtocell and a mobile device may be enhanced to transfer a unique identity (e.g. a unique global ID) of a mobile device to a femtocell to enable a femtocell to associate measurements of the mobile device (e.g. RSSI, RTT) with a specific mobile device in the same way that a WiFi AP can use the received MAC address of a mobile device to associate WiFi measurements with the mobile device. Possible protocols in which a unique identity (ID) of a mobile device might be transferred to a femtocell include the Radio Resource Control (RRC) protocol for LTE that is defined in 3GPP TS 36.331 and the RRC protocol for UMTS (and WCDMA) that is defined in 3GPP TS 25.331. The unique ID could be an existing unique global ID such as an International Mobile Equipment Identity (IMEI), an International Mobile Subscriber Identity (IMSI) or a public user SIP address. However, there may be several problems with using an existing global ID. One problem may be that an existing global ID may not be available to a positioning engine or positioning process inside a mobile device that may need to provide the global ID to a location server or to other entities (e.g. an application on the mobile device) that may interact with entities in a network or venue to receive location services. The global ID may not be available because of software or hardware limitations in the mobile device (e.g. if a positioning engine is implemented in a different hardware chip in the mobile device to a hardware chip or modem that supports external communication interfaces) or because the global ID is not available inside the mobile device (e.g. such as for a mobile device without a Subscriber Identity Module (SIM) card or Universal SIM (USIM) card identifying a user subscription). A second problem may be that a global ID may convey information about the user identity that makes it relatively easy to identify the user. Since messages sent by a mobile device to a femtocell such as RRC messages are not always encrypted (at least for initial access), information on the identity and location of the user of the mobile device may become available to other users jeopardizing the privacy of the user. A third problem may be that some global IDs may not be assigned to a mobile device. For example, a mobile device without a subscription to a public wireless operator may not have an IMSI. To overcome all three problems, a new type of global ID may be assigned to a mobile device that is based on and provided by an operator, vendor or provider for a mobile device or for some component of a mobile device such as a positioning engine or positioning process in a mobile device. This type of global ID is referred to as a global Provider ID (P-ID) herein. In an embodiment, a global P-ID may be assigned to or associated with a positioning engine or positioning process within a mobile device and may then be referred to as a global positioning engine (PE) ID. In another embodiment, a global P-ID may be the IMEI for a mobile device 204.

Figure 3:
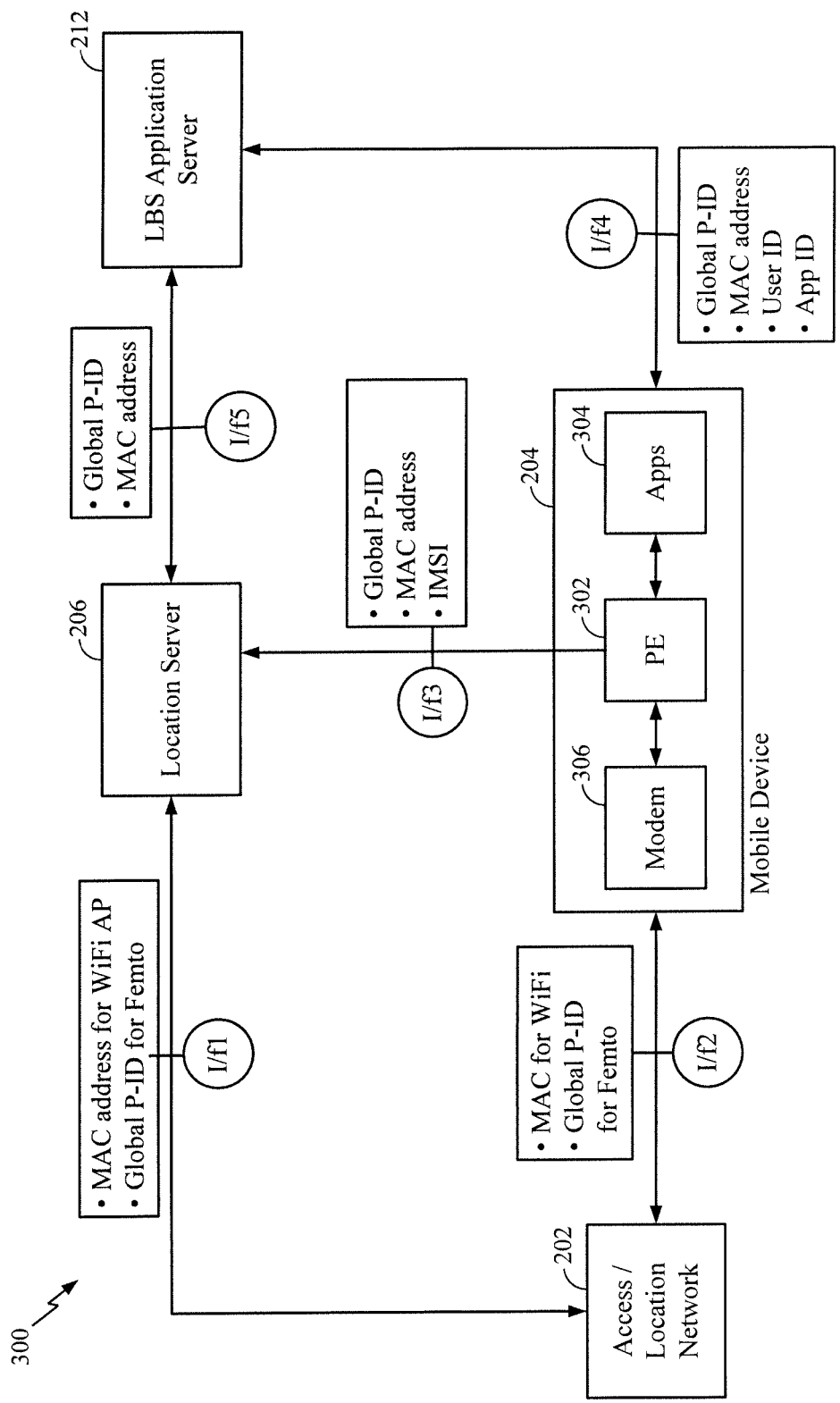
FIG. 3 is a schematic diagram illustrating a system for distributing a unique identifier according to an example embodiment.

According to a particular embodiment, FIG. 3 is a schematic diagram illustrating a system 300 for distributing a Global P-ID for a mobile device that may be detectable or visible to a femtocell transceiver in positioning operations (e.g., NC positioning operations). System 300 in FIG. 3 may comprise a subset of architecture 200 in FIG. 2 in which only entities and interfaces directly applicable to distribution of a global P-ID are shown. In the particular implementation of FIG. 3, entities and interfaces may correspond to entities and interfaces in FIG. 2 where like numbers are used (e.g., mobile device 204 in FIG. 3 may correspond to mobile device 204 in FIG. 2 although more internal detail is shown in FIG. 3). As shown in FIG. 3, a mobile device 204 may comprise: (i) one or more applications (Apps) 304 which may provide location related services to the user of mobile device 204 (e.g., navigation assistance) and may be in communication with LBS AS 212 over interface i/f 4; (ii) a positioning engine (PE) 302 for determining a location of mobile device 204 or assisting LS 206 to determine a location of mobile device 204, which may be in communication with LS 206 over I/f 3; and (iii) a modem 306 to transmit messages to and acquire messages from elements of ALN 202, such as a femtocell or WiFi AP, through interface i/f 2 over a wireless link. Apps 304, PE 302 and modem 306 are shown as logically distinct in FIG. 3 and may each be supported in mobile device 204 by distinct hardware and/or distinct software, or may instead be supported using common hardware and possibly some common software. Here, PE 302 may determine (e.g. from information configured in PE 302 or provided to PE 302 by an external source such a server belonging to a provider for a global P-ID), the globally unique P-ID, and may distribute the determined globally unique P-ID to applications 304 and modem 306. In other embodiments, a global P-ID may be configured in or provided to another element in mobile device 204 such as an HLOS, one of the Apps 304, the modem 306 or a SIM card or USIM card for mobile device 204. The element in which the global P-ID is configured or to which the global P-ID is provided by an external source may then distribute the global P-ID to other elements in mobile device 204 such as PE 302, modem 306 and one or more Apps 304. These other elements may then distribute the global P-ID to other entities such as ALN 202, LS 206 and LBS AS 212 and may include one or more other identifiers for mobile device 204 (e.g. such as a MAC address or App ID) when distributing the global P-ID that can then be associated with both mobile device 204 and the global P-ID.

FIG. 3 illustrates some of the possibilities for distributing the global P-ID and related identification information to entities external to mobile device 204 using interfaces i/f 1, i/f 2, i/f 3, i/f 4 and i/f 5 that were described previously. In the case of i/f 2, modem 306 may include the global P-ID in some messages sent to femtocells or a MAC address in some messages sent to WiFi or BT APs. For i/f 3, PE 302 may include the global P-ID and possibly a MAC address and/or IMSI in some messages sent to LS 206. For i/f 4, an App 404 may include the global P-ID and possibly a MAC address, user ID and/or App ID in some messages sent to LBS AS 212. For i/f 1, ALN 202 (e.g. a femtocell or AP in ALN 202) may send any global P-ID or MAC address received from modem 306 in some messages sent to LS 206. For i/f 5, LBS AS 212 may send any global P-ID and/or a MAC address received from an App 204 in some messages sent to LS 206. In some implementations of i/f 1, LS 206 may send any global P-ID and/or a MAC address received from PE 302 or from ALN 202 in some messages sent to LBS AS 212.

Distribution of a global P-ID as described above and as illustrated in FIG. 3 may enable identification of mobile device 204 when some interfaces support different identities for mobile device 204. For example, a particular embodiment of interface i/f 2 based on IEEE 802.11x standards may enable mobile device 204 to include its MAC address but not its global P-ID in messages sent to a WiFi AP (e.g. local transceiver 115) in ALN 202. Another embodiment of interface i/f 2 in FIG. 3 based on 3GPP standards for LTE or WCDMA may enable mobile device 204 to include its global P-ID but not its MAC address in messages sent to a femtocell (e.g. femtocell transceiver 110) in ALN 202. If the WiFi AP and femtocell each make a set of location related measurements for mobile device 204 based on receiving these messages, the measurements may be associated with the MAC address of mobile device 204 at the WiFi AP and with the global P-ID for mobile device 204 at the femtocell. In order to determine that all measurements refer to the same mobile device 204 (e.g., to enable both sets of measurements to be combined in order to determine a location estimate for mobile device 204 at LS 206), mobile device 204 may send both the MAC address and the global P-ID in association with one another (e.g. by sending both IDs within the same message, same procedure or same session) to another entity such as LS 206 using interface i/f 3 or LBS AS 212 using interface i/f 4. The recipient entity may then pass the pair of associated IDs to other entities (e.g. ALN 202, LS 206 and/or LBS AS 212) thereby allowing any entity to associate both sets of measurements with the same mobile device 204. A global P-ID may this enable a location to be determined for mobile device 204 using different devices (e.g. a femtocell and WiFi AP) in an ALN when different mobile device identities are supported by the different devices. As shown in FIG. 3, and where applicable, PE 302, an application 304 and modem 306 may each provide a global P-ID for mobile device 204 and/or another identity for mobile device 204 such as a MAC address to other entities such as ALN 202, LS 206 and LBS AS 212. In a particular implementation, LS 206 and/or LBS AS 212 may each uniquely associate mobile device 204 with either one or both of a MAC address or global P-ID. This may enable LS 206 to associate measurements reported from ALN 202 with mobile device 204 based on either the MAC address (e.g., if measurements were obtained at an IEEE std. 802.11x AP or BT AP) or the global P-ID (e.g., if measurements are obtained at a femtocell transceiver and are made using signals transmitted by modem 306 that contain or are otherwise associated with— e.g. via previous signals—the global P-ID). Furthermore, LBS AS 212 may also identify an App 304 in mobile device 204 using the global P-ID on interface i/f 4 even though a user ID or application ID may also be used on i/f 4 to identify the App or the user of mobile device 204. For example, if an App 204 provides both an App ID or user ID and a global P-ID to LBS AS 212 while registering to receive or otherwise requesting LBS service, LBS AS 212 may use the global P-ID to identify mobile device 204 on interface i/f 5 while requesting location information for mobile device 204 from LS 206 and/or while receiving and processing location parameters received from LS 206 for mobile device 204. This may avoid a need for LS 206 to identify mobile device 204 using an App ID or user ID and may instead enable LS 206 to identify mobile device 204 using a global P-ID.

A global P-ID may be distributed as follows within mobile device 204 and from mobile device 204 to other entities. First, a source entity of a global P-ID (e.g., PE 302, modem 306, an App 304, an HLOS for mobile device 204, a SIM or USIM card on mobile device 204 or some other software of hardware component of mobile device 200) may obtain a global P-ID from internal configuration data or from an external server (e.g. a provider for the source entity). Next, the source entity may transfer the global P-ID to other entities within mobile device (e.g., including but not limited to one or more of whichever of PE 302, modem 306 and Apps 304 are not the source entity). This transfer may use interfaces (e.g., Application Programming Interfaces) internal to mobile device 204. Moreover, an entity within mobile device that receives the global P-ID from another entity may relay the global P-ID to further entities. For example, if modem 306 is the source of the global P-ID, modem 306 may transfer the global P-ID to PE 302 which may relay the global P-ID to one or more Apps 304. PE 302 may then transfer the global P-ID and possibly other IDs for mobile device 204 such as a MAC address and/or IMSI to location server (LS) 206 over interface i/f 3 (e.g., which may be supported using the OMA SUPL ULP protocol). Modem 306 may include the global P-ID in signals or messages that modem 306 transmits (over i/f 2) to a femtocell in ALN 202. This may enable the femtocell in ALN 202 to make measurements of mobile device 204 (e.g., RSSI, RTT, AOA) that can be associated with the global P-ID. ALN 202 may then report the measurements to Location Server (LS) 206 (over i/f 1) along with the global P-ID either in the absence of a request from LS 206 or if requested by LS 206. If LS 206 has already received or later receives the global P-ID from mobile device 204 over interface i/f 3, LS 206 can associate the received measurements and any location derived from these with mobile device 204, and may then be able to estimate a location for mobile device 204 using an NC positioning method. An App 304 may transfer the global P-ID to LBS AS 212 over interface i/f 4—e.g. if registering for or requesting location services from LBS AS 212 such as a location service that may include or depend on the location of mobile device 204. LBS AS 212 may then transfer the global P-ID to LS 206 (over i/f 5)—e.g. if requesting the location of mobile device 204 from LS 206. Because the global P-ID may be provided over all interfaces to all entities, an entity may know the global P-ID of mobile device 204 and ensure that any location parameters obtained are for mobile device 204 and not some other mobile device, and ensure that any location parameters for mobile device 204 are returned only to mobile device 204 and not to some other mobile device. Thus, if LS 206 receives a request for the location of mobile device 204 from LBS AS 212 with the request carrying the global P-ID of mobile device 204, LS 206 may be enabled to return any location derived for mobile device 204 using NC positioning and/or MC positioning back to LBS AS 212 which can in turn return the location information to the App 304 on mobile device 204.

As described above and in the example process in FIG. 4A below, a global P-ID may be determined at least in part by a provider for mobile device 204 or for some component or entity within mobile device such as PE 302 or modem 306 and may be determined independently of public operator-determined identifiers (e.g., MSISDN, IMSI). As pointed out above, this may enable provision of location services to mobile device 204 when other globally unique IDs are not available or cannot be distributed to all entities (e.g. such as entities shown in FIG. 3) involved in providing location services to mobile device 204.

Figure 4A:
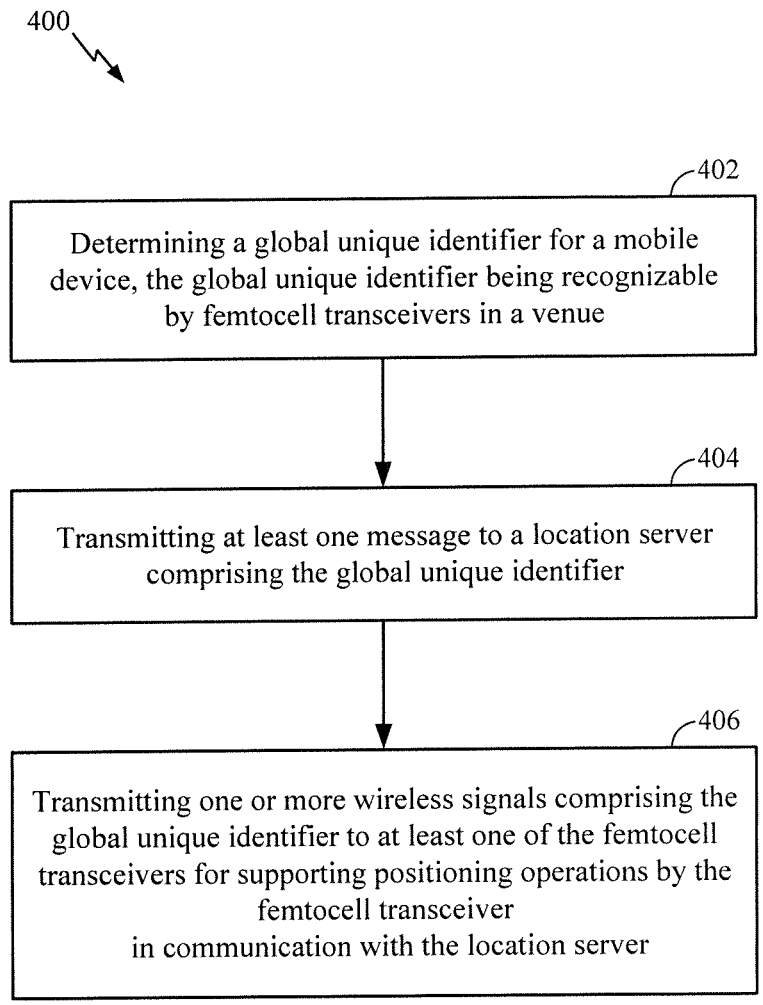
FIG. 4A is a flow diagram of a process for distributing a unique identifier according to an example embodiment.

FIG. 4A is a flow diagram of a process 400 for distributing a global unique identifier according to an embodiment. Such a global unique identifier may be a global P-ID or may be some other global identifier that is different to and independent of any global identifier (e.g., an IMSI, MSISDN or public user SIP identity) assigned by a public network operator. For the purpose of illustrating a non-limiting example implementation, specific actions performed in process 400 may be performed in whole or in part by a mobile device such as mobile device 204 or by entities or components within mobile device 204 (e.g., such as PE 306, modem 302 or an App 304). At block 402, a global unique identifier (ID) that is recognizable by femtocell transceivers in a venue (e.g. a femtocell in ALN 202) may be determined for a mobile device. As discussed above, such a global unique ID may be useful in positioning operations such as NC positioning techniques. At block 404, the mobile device (e.g. a positioning engine such as PE 302 in the mobile device) may transmit at least one message to a location server (e.g., to LS 206 over interface i/f 3) containing the global unique ID determined at block 402.

Figure 4B:
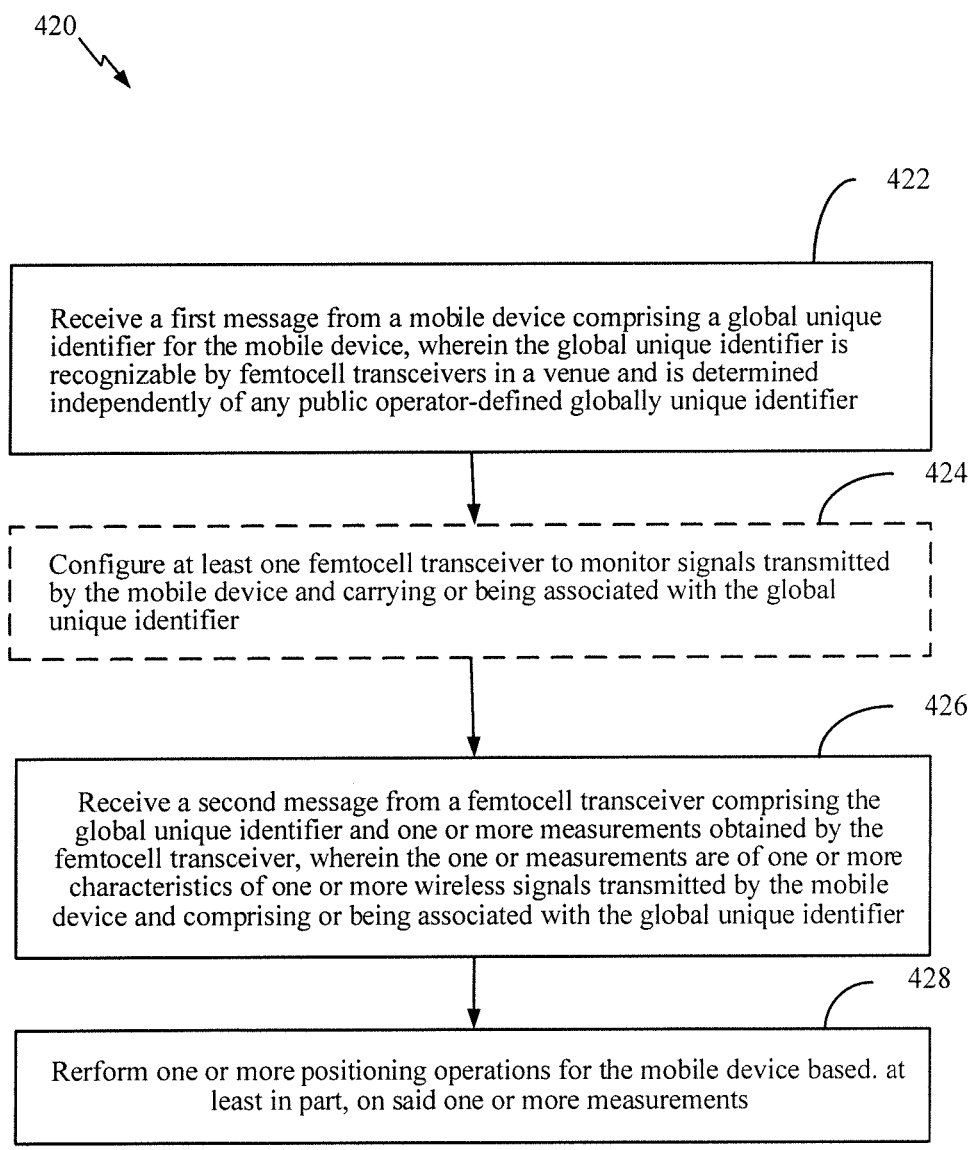
FIG. 4B is a flow diagram of a process for performing positioning operations based on measurements obtained from a femtocell, according to an example embodiment.

FIG. 4B is a flow diagram of a process 420 executed by a location server (e.g. LS 206) employing a global unique identifier transmitted at block 404 in positioning operations according to an embodiment. In a particular implementation, as pointed out above, having received the determined global unique ID at block 422, a location server may at block 424 configure elements of an ALN (e.g. ALN 202), including at least one femtocell transceiver, to monitor signals transmitted by the mobile device and carrying or being associated with the determined global unique ID. Block 424 is optional and may not occur in all embodiments of the process 420. At block 406 in process 400, the mobile device (e.g. a modem such as modem 306 in the mobile device) may transmit one or more wireless signals to an element of an access/location network (e.g., ALN 202) with the global unique identifier determined at block 402. This transmission may, for example, occur over interface i/f 2 to a femtocell transceiver such as an HNB configured to support UMTS or an HeNB configured to support LTE. The one or more wireless signals may be encoded with and/or modulated by the global unique identifier determined at block 402. In one particular implementation, the global unique identifier may be contained in messages transmitted by modem 306 such as RRC messages for WCDMA or RRC messages for LTE. The global unique identifier may then be obtained by normal signal demodulation and decoding (e.g., by a femtocell transceiver). Acquiring the transmitted signal, at least one femtocell transceiver in a venue may obtain the global unique identifier to support one or more positioning operations (e.g., NC positioning techniques) by the femtocell transceiver in communication with the location server. For example, the femtocell transceiver may make one or more measurements of one or more characteristics (e.g. RTT, RSSI, AOA) of the wireless signals transmitted at block 406 and/or of other wireless signals transmitted by the mobile device that can be associated with the signals transmitted at block 406 and with the global unique ID (e.g. due to being part of a common procedure). The femtocell transceiver may then send a message to the location server comprising the one or more measurements and the global unique identifier. The location server may receive the message from the femtocell transceiver at block 426 of process 420. The location server may then perform positioning operations for the mobile device at block 428 based, at least in part, on the measurements obtained in the message received at block 426. As pointed out elsewhere, such measurements may comprise any one of several types of measurements such as, for example, RSSI, AOA or RTT measurements, just to provide a few examples. Positioning operations may include, for example, computation of a position fix for the mobile device or other location based service using NC positioning techniques. It should be understood, however, that these are merely examples of positioning operations and claimed subject matter is not limited in these respects.

As shown later in association with FIG. 5 and FIG. 6, communication with the location server (e.g., at block 426 in process 420) may comprise sending and receiving (i) Positioning Calculation Application Part (PCAP) messages when the femtocell transceiver is an HNB configured according to UMTS or (ii) LTE Positioning Protocol A (LPPa) messages when the femtocell transceiver is an HeNB configured according to LTE. Here, the global unique identifier determined at block 402 and included in a message transmitted by the mobile device at block 404 and received at block 422 may be visible to or recoverable by a femtocell transceiver, and may allow the femtocell transceiver to associate particular measurements of the one or more signals encoding the message with the mobile device.

In another embodiment of the process 400 and the process 420, a femtocell transceiver may make measurements of one or more other signals transmitted by the mobile device that do not contain or encode the global unique ID but that are associated with the one or more signals that do contain or encode the global unique ID due to being part of a common procedure, common session or common association between the mobile device and the femtocell transceiver. For example, a common procedure may comprise an RRC procedure for LTE or an RRC procedure for WCDMA. As described above, for example, a femtocell transceiver may obtain one or more measurements (e.g., measurements of RSSI, RTT or AOA) from the acquired one or more signals that contain or encode the global unique identifier and/or the one or more other signals that do not contain or encode the global unique identifier. The femtocell may then transmit one or more messages (e.g., PCAP messages or LPPa messages) to a location server containing the one or more measurements in combination or in association with the global unique identifier obtained from the acquired one or more signals. Also, the one or more wireless signals transmitted at block 406 may be transmitted to a femtocell transceiver (or other device capable of acquiring cellular wireless signals) without a request from any femtocell transceiver. Thus, the mobile device may identify itself in a message using a global unique ID not in response to an initial request from a device in an ALN.

In an embodiment of the process 400, a femtocell may assign a signaling link or signaling association (e.g., an LTE or WCDMA signaling link or signaling association) to a mobile device in response to the mobile device requesting access to a network (e.g., to ALN 202) supported by the femtocell. The mobile device may include the global unique ID in at least one message sent to the femtocell prior to or after the signaling link or signaling association is assigned. The femtocell may use the signaling link or signaling association to make measurements (e.g., RSSI and/or RTT) for the mobile device. At that stage, signaling on the signaling link or signaling association may be ciphered and thus protected from interception or spoofing. A femtocell may also perform measurements without a signaling link or signaling association being assigned to the mobile device (e.g., before a signaling link or signaling association is assigned) in which case all messages sent by the mobile device that are used for measurements may carry the global P-ID.

In one particular example implementation, a global P-ID may comprise a symbol string as a concatenation of a "provider ID" and a "local ID" as follows:

Global P-ID=<provider ID><local ID>.

The provider ID may comprise a character string (e.g., alphanumeric character string) that is unique to the provider of the global P-ID. This provider may also be a provider of the mobile device (e.g., a manufacturer) or a provider of a component of the mobile device (e.g. the manufacturer or vendor of a positioning engine on the mobile device such as PE 302 in FIG. 3). The local ID may comprise a character string that is assigned or determined by the provider of the provider ID and may be unique among local IDs that are assigned by this provider. In one particular implementation a specialized server owned or operated by the provider of the provider ID may provide the global P-ID or just the a local ID portion of the global P-ID to a mobile device or to a component on the mobile device (e.g. a positioning engine in the mobile device such as PE 302) if the mobile device or the mobile device component instigates interaction with the specialized server for any reason (e.g., to obtain positioning assistance data in the case of a positioning engine) or if the specialized server is able to instigate interaction with the mobile device or the component on the mobile device. In another implementation, the global P-ID may be configured in the mobile device (e.g., in a positioning engine for the mobile device or in some other component on the mobile device) during manufacture or production and not need to be provided by a server.

As pointed out above, a component entity of a mobile device 204 that is a source of a global P-ID (e.g. PE 302) may locally store and distribute the global P-ID to other components in the mobile device such as modem 306 and one or more Apps 304—e.g. via an HLOS application programming interface (API). Mobile device 204 (or components of mobile device 204) may then distribute the global P-ID to external entities such as LS 206 and LBS AS 212. In one implementation, PE 302 in mobile device 204 may provide the global P-ID to LS 206 in a SUPL ULP message. Similarly, PE 302 or modem 306 may provide the global P-ID to an IEEE std. 802.11x AP (e.g. an AP in ALN 202) in a standard IEEE 802.11x frame or as an extension of a standard IEEE 802.11x frame. PE 302 or modem 306 may also provide the global P-ID to a femtocell transceiver (e.g. in ALN 202), for example using an RRC message or an extension to an RRC message, where RRC may be for LTE (e.g. as defined in 3GPP TS 36.331) if the femtocell supports LTE or for WCDMA (e.g. as defined in 3GPP 25.331) if the femtocell supports WCDMA.

Figure 4C:
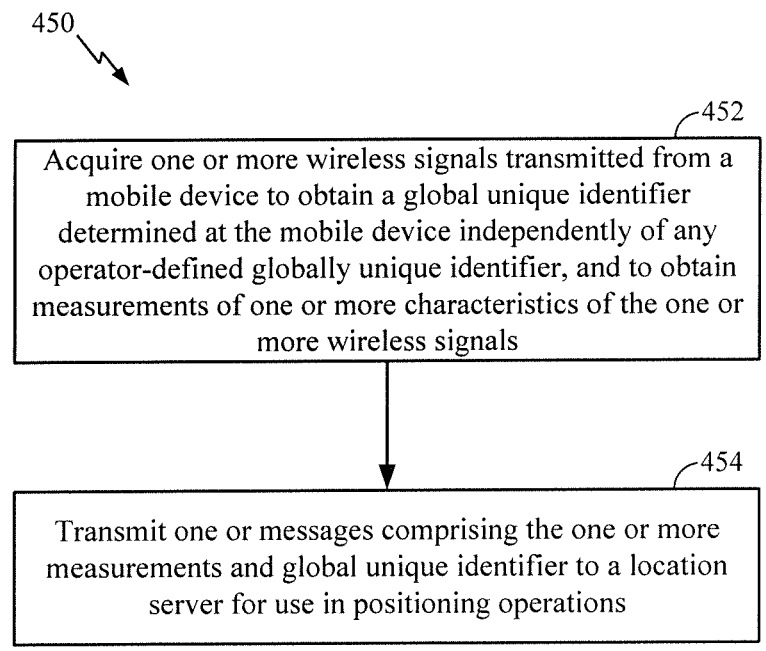
FIG. 4C is a flow diagram of a process for handing a unique identifier from a signal acquired at a femtocell transceiver according to an example embodiment.

FIG. 4C is a flow diagram of a process 450 performed at a femtocell transceiver (e.g., integrated as part of ALN 202) to obtain information from wireless signals transmitted from a mobile device (e.g., mobile device 204) for use in positioning operations, for example. At block 452 the femtocell transceiver may acquire one or more wireless signals transmitted from a mobile device and may obtain from the one or more wireless signals a globally unique identifier determined at the mobile device independently of any operator-defined globally unique identifier. The femtocell transceiver may further obtain measurements of one or more characteristics of the one or more wireless signals or of other associated wireless signals transmitted by the mobile device that can be associated with the one or more wireless signals—e.g. due to belonging to a common procedure or common association. The globally unique identifier may be determined by the mobile device as described above in connection with block 402 and may be a global P-ID in some embodiments. Measured characteristics obtained from acquisition of the one or more wireless signals or the one or more other associated wireless signals may include, for example, RSSI, RTT and/or AOA. At block 454, the femtocell transceiver may transmit one or more messages to a location server (e.g., LS 206) comprising the one or more measurements and globally unique identifier for use in positioning operations (e.g., NC positioning operations) by the location server. In some embodiments, the femtocell transceiver may also receive one or more messages from the location server (e.g., LS 206) comprising the globally unique identifier for use in instigating measurements for the mobile device (e.g., measurements for NC positioning operations) by the femtocell transceiver.

In some embodiments of process 450, a femtocell may comprise an HNB configured to support UMTS and, as shown later in association with FIG. 6, the one or more messages transmitted to the location server (and/or received from the location server) may comprise Positioning Calculation Application Part (PCAP) messages. In other embodiments of the process 450, a femtocell may comprise an HeNB configured to support LTE and, as shown later in association with FIG. 5, the one or more messages transmitted to the location server (and/or received from the location server) may comprise LTE Positioning Protocol A (LPPa) messages.

If, in particular implementations, femtocells are included in the architecture described previously in association with FIG. 2 and FIG. 3 (e.g., if ALN 202 in FIG. 2 and/or FIG. 3 includes one or more femtocells), it may be desirable that interaction between the ALN 202 and LS 206 over interface i/f 1 be similar to or the same as that described previously for interface i/f 1 (e.g., in the case that ALN 202 comprises WiFi and/or BTs APs but not femtocells). For example, it may be desirable that interface i/f 1 can transfer messages from LS 206 to ALN 202 to configure femtocells in ALN 202 to detect and obtain measurements from mobile devices in the coverage area of ALN and/or to provide positioning assistance data to a mobile device 204 via broadcast or unicast. In addition, it may be desirable that interface i/f 1 can transfer messages from ALN 202 to LS 206 carrying (i) measurements obtained by one or more femtocells in ALN 202 of signals transmitted by a mobile device 204 and/or (ii) measurements obtained by a mobile device 204, and transferred by the mobile device 204 to one or more femtocells in ALN 202, of signals transmitted by femtocells in ALN 202. Transfer of these messages on interface i/f 1 may enable LS 206 to compute a location or obtain parameters related to a location or presence of mobile device 204 in a certain area such as a venue. In addition, and as described earlier, messages transferred over interface i/f 1 between LS 206 and femtocells in ALN 202 may be transferred via an intermediate entity such as an ALN controller or router. This type of communication between a femtocell or intermediate ALN entity and a location server over interface i/f 1 may not be supported by existing control plane location solutions such as those defined by 3GPP and 3GPP2 and may not be supported by user plane location solutions such as the OMA SUPL solution. A principal limitation of each of these solutions may be an inability by femtocells to help locate a mobile device (e.g., make measurements of signals transmitted by the mobile device or receive measurements made by the mobile device of signals transmitted by the femtocell or other nearby femtocells) where a mobile device is not already attached to a network to which the femtocells belong. In one implementation, to overcome this limitation, interface i/f1 may be configured to support interaction, as just described, between a femtocell or intermediate entity in ALN 202 and a location server, to transfer location related parameters on behalf of a mobile device 204 that has no association with any femtocell and no attachment to the network to which a femtocell belongs. This type of interaction on interface i/f 1 is referred to herein as "non-associated interaction". In addition, interface 1 may need support interaction on behalf if a mobile device that has an association with a femtocell and is attached to the network to which the femtocell belongs, which is referred to as "associated interaction" herein.

Figure 5:
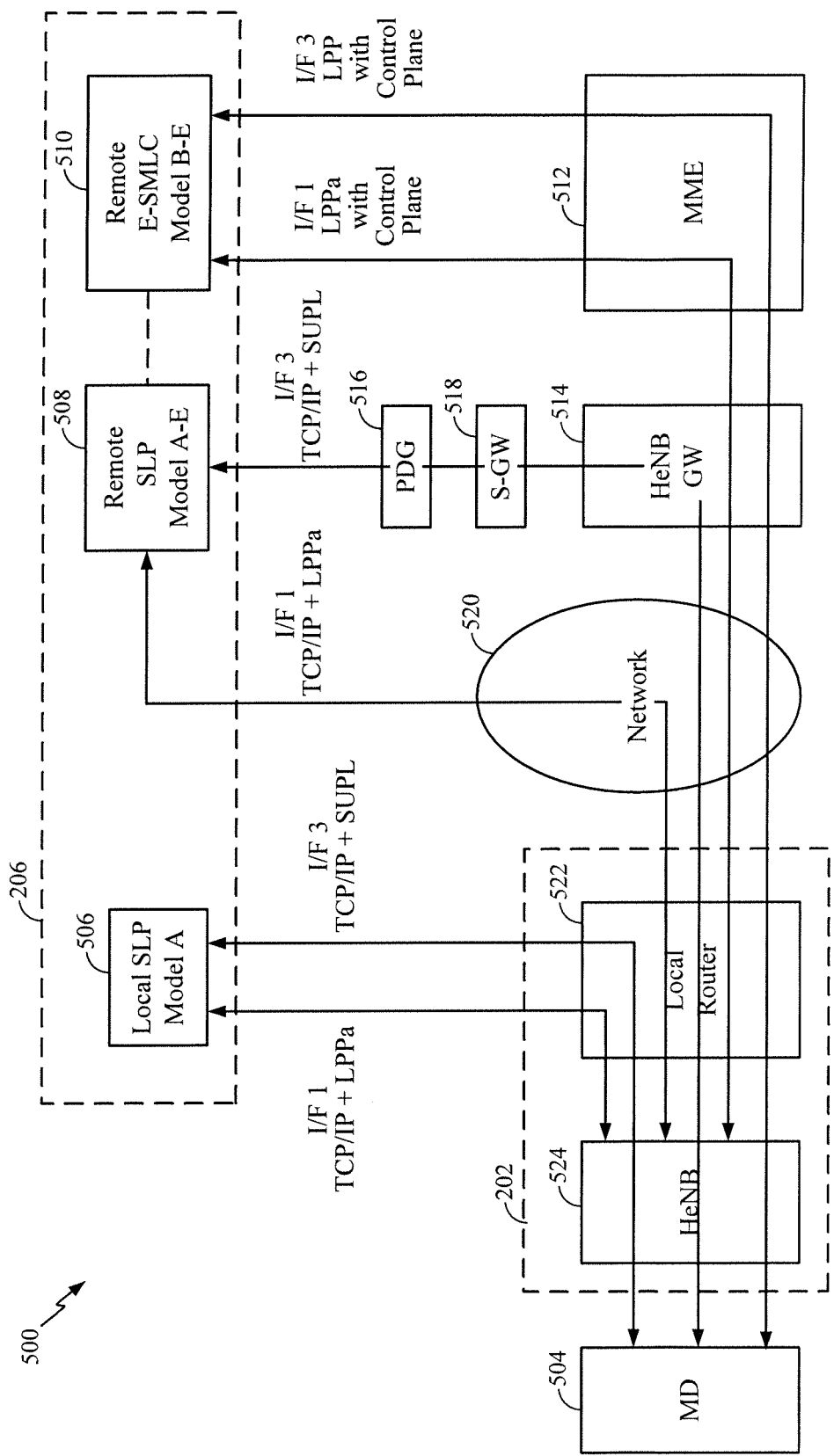
FIG. 5 is a schematic diagram of an integration of a femtocell with a location server in a local network environment according to an example embodiment.

FIG. 5 is a schematic diagram of a system 500 comprising an integration of a femtocell with a location server in a local network environment according to an embodiment. The system 500 may comprise a subset of the architectures described earlier in association with FIG. 2 and FIG. 3 and may enable interface i/f 1 to support non-associated interaction between an LS 206 and femtocells in ALN 204 as just described. In this particular implementation, a femtocell transceiver 524 may be configured as an HeNB to provide communication service to mobile device 504 according to LTE. While FIG. 5 depicts femtocell transceiver 524 as an HeNB according to an LTE implementation, it should be understood that this is merely an example femtocell transceiver, and other femtocell transceivers according to different carrier protocols may be used without deviating from claimed subject matter. For example, any small, low powered base station may suffice. FIG. 5 illustrates location support for a mobile device (MD) 504 by femtocell transceiver 524 and one or more location servers (LSs) 506, 508 and 510. Communication between femtocell transceiver 524 and the one or more LSs 506, 508 and 510 may be via a local router 522 and possibly other entities such as network 520, HeNB Gateway (GW) 514, Serving Gateway (S-GW) 518, Packet Data Network Gateway (PDG) 516 and Mobility Management Entity (MME) 512. Network 520 may comprise an intranet for a provider of location and/or communication services for mobile device 504 and/or may comprise an ISP (e.g. an ISP providing DSL or packet cable access) and/or may comprise the Internet. HeNB GW 514 may comprise a security and/or access gateway for femtocell transceiver 524 when functioning as an HeNB (e.g. as defined in 3GPP TS 36.300) and may enable data and signaling transport between femtocell transceiver 524 and other entities such as MME 512, LS 508 and/or LS 510. S-GW 518 and PDG 516 may provide external data and voice access to mobile device 504 and may support data transport based on IP between mobile device 504 and LS 508 and/or other entities (e.g. other mobile devices) not shown in FIG. 5. PDG 516 may further assign an externally visible IP address to mobile device 504 and perform IP routing on behalf of mobile device. Femtocell transceiver 524 and local router 522 may form all or part of ALN 202 which may correspond to ALN 202 described in association with FIG. 2 and FIG. 3. Any one of location servers 506, 508 and 510 may correspond to LS 206 in FIG. 2 and FIG. 3. Mobile device 504 may correspond to mobile device 204 in FIG. 2 and FIG. 3. Due to this correspondence, system 500 may be a subset of the architecture 200 shown in FIG. 2 and a subset of the system 300 shown in FIG. 3 from the perspective of supporting location services. However, system 500 includes additional elements (e.g. local router 522) that are not shown in FIG. 2 and FIG. 3 and shows different implementations for LS 206 that are not shown in detail in FIG. 2 and FIG. 3. System 500 may correspond to alternative implementations of the architecture 200 in FIG. 2 and the system 300 in FIG. 3 in the case that ALN 202 comprises a femtocell transceiver as described further on herein. In each of these alternative implementations, a global P-ID may be supported for the mobile device 504 as described previously herein and non-associated interaction may be supported on interface i/f 1 between femtocell transceiver 524 and each LS 506 and 508.

In one implementation, mobile device 504 and femtocell transceiver 524 may communicate with an LS configured as LS 506, which may communicate with mobile device 504 and/or femtocell transceiver 524 through local router 522. In this implementation, LS 506 may comprise an SLP (e.g., a D-SLP) that is local to femtocell transceiver 524 (e.g., owned and operated by a venue owner or venue operator) and system 500 may then correspond to a subset of the model A, described previously for architecture 200. Here, femtocell transceiver 524 may communicate with LS 506 over interface i/f 1 using LTE positioning protocol A (LPPa) messages over a transport protocol such as Transmission Control Protocol (TCP) over the Internet Protocol (IP) or Stream Control Transmission Protocol (SCTP) over IP (not shown in FIG. 5) or some other transport protocol that may use IP as a means of communication. Here, LPPa messages may be used to support both associated and non-associated interaction over interface i/f 1 on behalf of mobile device 504. To indicate a mobile device 504 to which any LPPa message may apply, the LPPa message may include an identifier for the mobile device such as a global P-ID or a MAC address. Similarly, to support interaction over interface i/f 3 between LS 506 and mobile device 504, the SUPL ULP protocol may be used over TCP/IP. Here, femtocell transceiver 524 may support transfer of SUPL ULP messages between mobile device 504 and LS 506 by transferring SUPL ULP messages received from mobile device 504 to local router 522 for onward routing to LS 506 and transferring SUPL ULP messages received from LS 506 via local router 522 to mobile device 504. Femtocell transceiver 524 may transfer and route SUPL ULP messages at the IP level via an association of a distinct IP address to mobile device 504 and an association of another distinct IP address to LS 506 (or to local router 522 if local router 522 is used to route messages at the IP level to LS 506). This may require that mobile device 504 have an association with femtocell transceiver 524 and be attached to the network to which femtocell transceiver 524 belongs. However, if femtocell transceiver 524 only obtains measurements of mobile device 504 and sends these to LS 506 using LPPa and does not relay messages from LS 506 to mobile device 504, it may be unnecessary for femtocell transceiver 524 to associate an IP address with mobile device 504 and non-associated interaction may then be supported over interface i/f 1 on behalf of mobile device 504.

Implementation of LPPa over interface i/f 1 between femtocell transceiver 524 and LS 506 may enable femtocell transceiver 524 to obtain and transfer to LS 506 measurements of signals transmitted from mobile device 504 such as measurements of RTT, RSSI, AOA among others to support NC positioning of mobile device 504 and may help support MC positioning techniques such as OTDOA and E-CID for mobile device 504 (e.g., where OTDOA and/or E-CID measurements and assistance data are transferred between LS 506 and mobile device 504 over interface i/f 3 using SUPL) by enabling femtocell transceiver 524 to provide LS 506 with data concerning the transmission timing of femtocell transceiver 524 or other nearby femtocell transceivers and/or other data about femtocell transceiver 524 such as transmission power, antenna gain, location coordinates etc. . . . Since communication between LS 506 and either mobile device 504 or femtocell transceiver 524 need not pass through a network or an ISP, LS 506 may be conveniently provided/controlled by a venue operator on-site.

In another implementation, mobile device 504 and femtocell transceiver 524 may communicate with an LS configured as LS 508 through a local router 522 and a network 520 and, in the case of interface i/f 3, an HeNB GW 514, S-GW 518 and PDG 516. In this implementation, LS 508 may comprise an SLP (e.g., a D-SLP) that is remote from femtocell transceiver 524 (e.g., owned and operated by a public network provider of femtocell transceiver 524) and system 500 may then correspond to a subset of the model A, B, C, D or E described previously for architecture 200. Here, HeNB GW 514, S-GW 518 and PDG 516 may be owned and operated by the public network operator who owns femtocell transceiver 524. Similarly to the implementation described previously for LS 506, femtocell transceiver 524 may communicate with LS 508 over interface i/f 1 using LTE positioning protocol A (LPPa) messages over TCP/IP or SCTP/IP (not shown in FIG. 5) or some other transport protocol that may use IP as a means of communication. Here, LPPa messages may be used to support both associated and non-associated interaction over interface i/f 1 on behalf of mobile device 504 and may indicate a mobile device 504 to which any LPPa message may apply by including an identifier for the mobile device such as a global P-ID or MAC address. Similarly, to support interaction over interface i/f 3 between LS 508 and mobile device 504, the SUPL ULP protocol may be used over TCP/IP. Unlike the implementation associated with LS 506, in the implementation associated with LS 508, mobile device 504 may obtain an IP connection from PDG 516 to access LS 508 using existing LTE capability and femtocell 524 may not need to route SUPL ULP messages using an IP address for mobile device 504. This support of interface i/f 3 (though not necessarily support of interface i/f 1) may also be enabled by an association of mobile device 504 with femtocell 524 and/or by attachment of mobile device 504 to the network to which femtocell 525 belongs. Implementation of LPPa over interface i/f 1 between femtocell transceiver 524 and LS 508 may similarly enable femtocell transceiver 524 to obtain and transfer to LS 508 measurements of signals transmitted from mobile device 504 such as measurements of RTT, RSSI, AOA among others to support NC positioning of mobile device 504, and may enable MC positioning techniques such as OTDOA and E-CID for mobile device 504 (e.g. where OTDOA and/or E-CID measurements and assistance data are transferred between LS 508 and mobile device 504 over interface i/f 3 using SUPL) by enabling femtocell transceiver 524 to provide LS 508 with data concerning the transmission timing of femtocell transceiver 524 or other nearby femtocell transceivers and/or other data about femtocell transceiver 524 such as transmission power, antenna gain, location coordinates etc. . . .

In a further implementation, mobile device 504 and femtocell transceiver 524 may communicate with an LS configured as LS 510, which may communicate with mobile device 504 and/or femtocell transceiver 524 through an MME 512, HeNB GW 514, network 520 and local router 522. In this implementation, LS 510 may comprise an E-SMLC that is remote from femtocell transceiver 524 (e.g., owned and operated by a public network provider of femtocell transceiver 524) and system 500 may then correspond to a subset of the model B, C, D or E described previously for architecture 200. Here, network 520 may include a DSL or packet cable network and possibly the Internet. HeNB GW 514 and MME 512 may be owned and operated by the public network operator who owns femtocell transceiver 524 and may correspond to the same named entities defined by 3GPP to support LTE access using an HeNB—e.g. as defined in 3GPP TS 36.300 and TS 23.401. Further, mobile device 504 may be attached to an LTE network with femtocell transceiver 524 being a serving HeNB for mobile device 504 and MME 512 being a serving MME. In this implementation, interface i/f 1 between LS 510 and femtocell transceiver 524 may be supported using LPPa according to the control plane location solution defined by 3GPP for LTE in 3GPP TS 23.271 and TS 36.305 and interface i/f 3 between mobile device 504 and LS 510 may be supported using LPP and/or LPP/LPPe according to the control plane location solution defined by 3GPP for LTE in 3GPP TS 23.271 and TS 36.305. In this implementation, interfaces i/f 1 and i/f 3 may correspond to existing interfaces for the 3GPP control plane location solution for LTE. However, in an embodiment, LS 510 may be linked to LS 508 or combined with LS 508 (e.g. in the same physical LS). In this embodiment, LS 510 (or an LS 510 component of a combined LS 508 and 510) may support interface i/f 1 to the femtocell transceiver using LPPa according to the 3GPP control plane location solution for LTE and as just described while LS 508 (or an LS 508 component of a combined LS 508 and 510) may support interface i/f 3 to the femtocell transceiver as previously described using the OMA SUPL ULP protocol over TCP/IP. An advantage of this embodiment may to reduce impacts to the combined LS 508 and 510 and to femtocell transceiver 524 since interface i/f 1 may be supported according to the existing 3GPP control pane location solution for LTE whereas interface i/f 3 may be supported according to the existing OMA SUPL solution which may avoid adding new impacts not already defined for these solutions.

Figure 6:
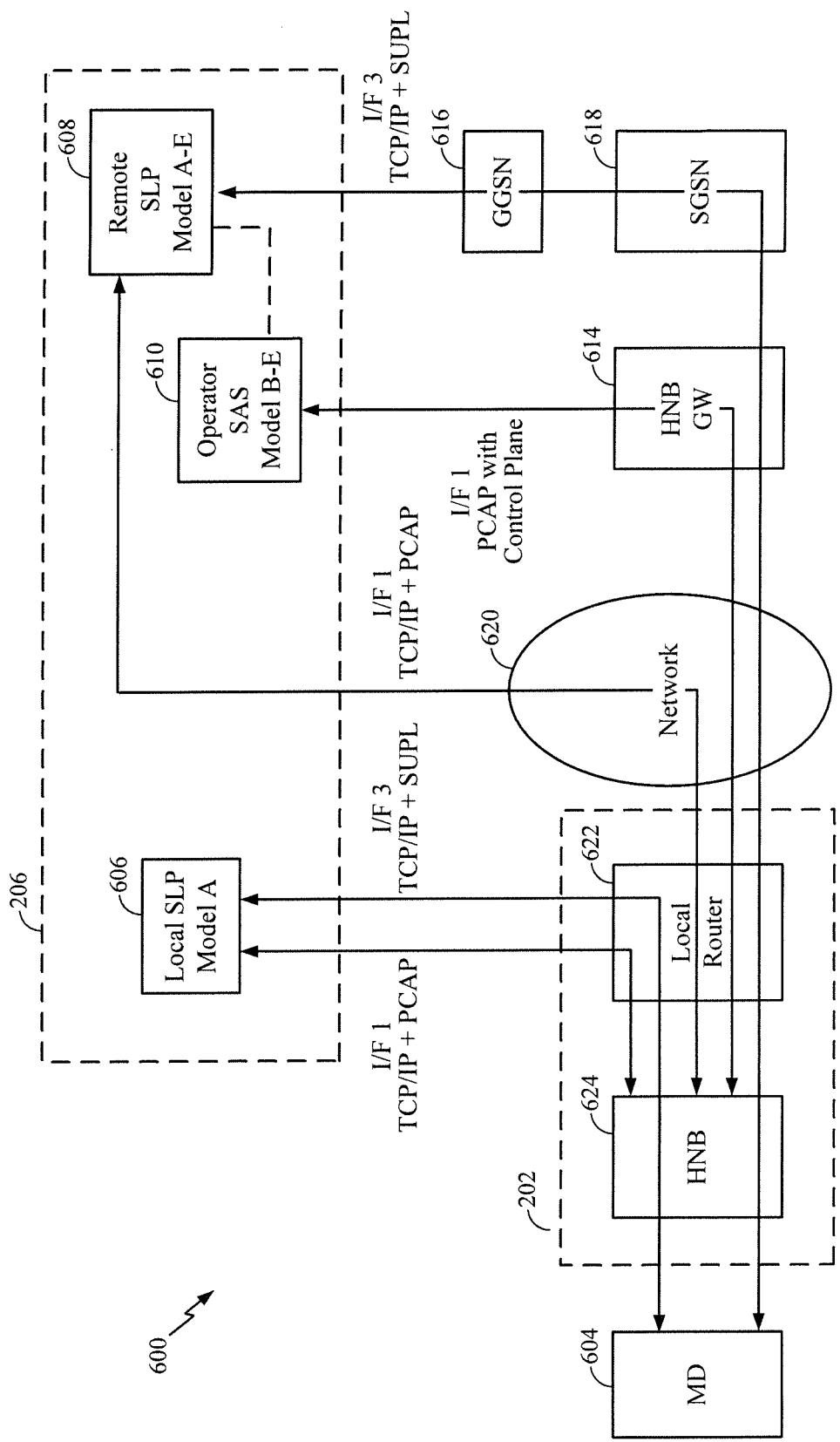
FIG. 6 is a schematic diagram of an integration of a femtocell with a location server in a local network environment according to an example embodiment.

FIG. 6 is a schematic diagram of a system 600 comprising an integration of a femtocell with a location server in a local network environment according to an embodiment. In this particular implementation, a femtocell transceiver 624 may comprise an HNB and may be configured to provide service to mobile device 604 according to UMTS (e.g. using WCDMA). While FIG. 6 depicts femtocell transceiver 624 as an HNB according to a UMTS implementation, it should be understood that this is merely an example femtocell transceiver, and other femtocell transceivers according to different carrier protocols may be used without deviating from claimed subject matter. For example, any small, low powered base station may suffice. The system 600 may be similar to the system 500 previously described except that while system 500 may support location services for a mobile device having LTE access, system 600 may support location services for a mobile device having UMTS access.

The system 600 may comprise a subset of the architectures described earlier in association with FIG. 2 and FIG. 3, and may enable interface i/f 1 to support non-associated interaction between an LS 206 and femtocells in ALN 204 as previously described. FIG. 6 illustrates location support for a mobile device (MD) 604 by femtocell transceiver 624 and one or more location servers (LSs) 606, 608 and 610. Communication between femtocell transceiver 624 and the one or more LSs 606, 608 and 610 may be via a local router 622 and possibly other entities such as network 620, HNB Gateway (GW) 614, Serving General Packet Radio Service (GPRS) Support Node (SGSN) 618 and Gateway GPRS Support Node (GGSN) 616. Network 620 may correspond to network 520 in system 500 and comprise an intranet for a provider of location and/or communication services for mobile device 604 and/or may comprise an ISP (e.g. an ISP providing DSL or packet cable access) and/or may comprise the Internet. HNB GW 614 may comprise a security and/or access gateway for femtocell transceiver 624 while functioning as an HNB (e.g., as defined in 3GPP TS 25.467) and may enable data and signaling transport between femtocell transceiver 624 and other entities such as SGSN 618, LS 608 and/or LS 610. SGSN 618 and GGSN 616 may provide external data and voice access to mobile device 604 and may support data transport based on IP between mobile device 604 and LS 608 and/or other entities (e.g. other mobile devices) not shown in FIG. 6. GGSN 616 may further assign an externally visible IP address to mobile device 604 and perform IP routing on behalf of mobile device 604. Femtocell transceiver 624 and local router 622 may form all or part of ALN 202 which may correspond to ALN 202 described in association with FIG. 2, FIG. 3 and/or FIG. 5. Any one of location servers 606, 608 and 610 may correspond to LS 206 in FIG. 2 and FIG. 3. Further, location servers 606, 608 and 610 may each correspond, respectively, to location servers 506, 508 and 510 in FIG. 5—e.g. in the case of a location service provider who supports location of mobile devices using an ALN 202 that includes femtocell transceivers supporting both LTE access and UMTS access. Mobile device 604 may correspond to mobile device 204 in FIG. 2 and FIG. 3 and/or to mobile device 504 in FIG. 5 (e.g. in the case of a mobile devices that supports both LTE and UMTS access). Due to this correspondence, system 600 may comprise a subset of the architecture 200 shown in FIG. 2 and a subset of the system 300 shown in FIG. 3 from the perspective of supporting location services. Further, system 600 may be part of a larger system (not shown in FIG. 6) that also includes system 500 shown in FIG. 5. System 600 may correspond to alternative implementations of the architecture 200 in FIG. 2 and the system 300 in FIG. 3 in the case that ALN 202 comprises a femtocell transceiver as described further on herein. In each of these alternative implementations, a global P-ID may be supported for the mobile device 604 as described previously herein and non-associated interaction may be supported on interface i/f 1 between femtocell transceiver 624 and each LS 606 and 608.

In one implementation, mobile device 604 and femtocell transceiver 624 may communicate with an LS configured as LS 606, which may communicate with mobile device 604 and/or femtocell transceiver 624 through local router 622. In this implementation, LS 606 may comprise an SLP (e.g. a D-SLP) that is local to femtocell transceiver 624 (e.g., owned and operated by the provider or operator of a venue) and system 600 may then correspond to a subset of the model A, described previously for architecture 200. Here, femtocell transceiver 624 may communicate with LS 606 over interface i/f 1 using Positioning Calculation Application Part (PCAP) messages over a transport protocol such as Transmission Control Protocol (TCP) over IP or Stream Control Transmission Protocol (SCTP) over IP (not shown in FIG. 6) or some other transport protocol that may use IP as a means of communication. Here, PCAP may be as defined in 3GPP TS 25.453 and may be used to support both associated and non-associated interaction over interface i/f 1 on behalf of mobile device 604. To indicate a mobile device 604 to which any PCAP message may apply, the PCAP message may include an identifier for the mobile device such as a global P-ID or MAC address. Similarly, to support interaction over interface i/f 3 between LS 606 and mobile device 604, the SUPL ULP protocol may be used over TCP/IP. Here, femtocell transceiver 604 may support transfer of SUPL ULP messages between mobile device 604 and LS 606 by transferring SUPL ULP messages received from mobile device 604 to local router 622 for onward routing to LS 606 and transferring SUPL ULP messages received from LS 606 via local router 622 to mobile device 604. Femtocell transceiver 624 may transfer and route SUPL ULP messages at the IP level via an association of a distinct IP address to mobile device 604 and another IP address to LS 606. This may be enabled by an association of mobile device 604 with femtocell transceiver 624 and/or by attachment of mobile device 604 to the network to which femtocell transceiver 624 belongs. However, if femtocell transceiver 624 only obtains measurements of mobile device 604 and sends these to LS 606 using PCAP and does not relay messages from LS 606 to mobile device 604, it may be unnecessary for femtocell transceiver 624 to associate an IP address with mobile device 604 and non-associated interaction may then be supported over interface i/f 1 on behalf of mobile device 604.

Implementation of LPPa over interface i/f 1 between femtocell transceiver 624 and LS 606 may enable femtocell transceiver 624 to obtain and transfer to LS 606 measurements of signals transmitted from mobile device 604 such as measurements of RTT, RSSI, AOA among others to support NC positioning of mobile device 604, and may help support MC positioning techniques such as OTDOA and E-CID for mobile device 604 (e.g. where OTDOA and/or E-CID measurements and assistance data are transferred between LS 606 and mobile device 604 over interface i/f 3 using SUPL) by enabling femtocell transceiver 624 to provide LS 606 with data concerning the transmission timing of femtocell transceiver 624 or other nearby femtocell transceivers and/or other data about femtocell transceiver 624 such as transmission power, antenna gain, location coordinates etc. . . . Since communication between LS 606 and either mobile device 604 or femtocell transceiver 624 need not pass through a network or an ISP, LS 606 may be conveniently provided/controlled by a venue operator on-site.

In another implementation, mobile device 604 and femtocell transceiver 624 may communicate with an LS configured as LS 608 through a local router 622 and a network 620 and, in the case of interface i/f 3, an HNB GW 614, SGSN 618 and GGSN 616. In this implementation, LS 608 may comprise an SLP (e.g., a D-SLP) that is remote from femtocell transceiver 624 (e.g., owned and operated by a public network provider of femtocell transceiver 624) and system 600 may then correspond to a subset of the model A, B, C, D or E described previously for architecture 200. Here, HNB GW 614, SGSN 618 and GGSN 616 may be owned and operated by the public network operator that owns femtocell transceiver 624. Similarly to the implementation described previously for LS 606, femtocell transceiver 624 may communicate with LS 608 over interface i/f 1 using PCAP messages transported over TCP/IP or SCTP/IP (not shown in FIG. 6) or some other transport protocol that may use IP as a means of communication. Here, PCAP messages may be used to support both associated and non-associated interaction over interface i/f 1 on behalf of mobile device 604 and may indicate a mobile device 604 to which any PCAP message may apply by including an identifier for the mobile device such as a global P-ID or MAC address. Similarly, to support interaction over interface i/f 3 between LS 608 and mobile device 504, the SUPL ULP protocol may be used over TCP/IP. Unlike the implementation associated with LS 606, in the implementation associated with LS 608, mobile device 604 may obtain an IP connection through GGSN 616 to access LS 608 using existing GPRS capability and femtocell 624 may not need to route SUPL ULP messages using an IP address for mobile device 604. This support of interface i/f 3 (though not necessarily support of interface i/f 1) may also be enabled by an association of mobile device 604 with femtocell 624 and/or by attachment of mobile device 604 to the network to which femtocell 624 belongs. Implementation of PCAP over interface i/f 1 between femtocell transceiver 624 and LS 608 may similarly enable femtocell transceiver 624 to obtain and transfer to LS 608 measurements of signals transmitted from mobile device 604 such as measurements of RTT, RSSI, AOA among others to support NC positioning of mobile device 604 and may help support MC positioning techniques such as OTDOA and E-CID for mobile device 604 (e.g. where OTDOA and/or E-CID measurements and assistance data are transferred between LS 608 and mobile device 604 over interface i/f 3 using SUPL) by enabling femtocell transceiver 624 to provide LS 608 with data concerning the transmission timing of femtocell transceiver 624 or other nearby femtocell transceivers and/or other data about femtocell transceiver 624 such as transmission power, antenna gain, location coordinates etc. . . .

In a further implementation, mobile device 604 and femtocell transceiver 624 may communicate with an LS configured as LS 610 through local router 622, network 620 and an HNB GW 614. In this implementation, LS 610 may comprise an SAS that is remote from femtocell transceiver 624 (e.g., owned and operated by a public network provider of femtocell transceiver 624) and system 600 may then correspond to a subset of the model B, C, D or E described previously for architecture 200. Here, HNB GW 614 may be owned and operated by the public network operator that owns femtocell transceiver 624. Further, mobile device 604 may be attached to a UMTS network with femtocell transceiver 624 being a serving HNB for mobile device 604. In this implementation, interface i/f 1 between LS 610 and femtocell transceiver 624 may be supported using PCAP according to the control plane location solution defined by 3GPP for UMTS in 3GPP TS 23.271 and TS 25.305. Interface i/f 3 between mobile device 604 and LS 610 may not be supported directly (e.g., using a common positioning protocol between mobile device 604 and LS 610) but may be supported indirectly using a combination of RRC between mobile device 604 and femtocell transceiver 624 (not shown in FIG. 6) and PCAP on interface i/f 1 between femtocell transceiver 624 and LS 610 according to the control plane location solution defined by 3GPP for UMTS in 3GPP TS 36.305. In this implementation, interfaces i/f 1 and i/f 3 may correspond to existing interfaces for the 3GPP control plane location solution for UMTS. However, in an embodiment, LS 610 may be linked to LS 608 or combined with LS 608 (e.g., in the same physical LS). In this embodiment, LS 610 (or an LS 610 component of a combined LS 608 and 610) may support interface i/f 1 to the femtocell transceiver 624 using PCAP according to the 3GPP control plane location solution for UMTS and as just described while LS 608 (or an LS 608 component of a combined LS 608 and 610) may support interface i/f 3 to the femtocell transceiver as previously described using the OMA SUPL ULP protocol over TCP/IP. An advantage of this embodiment may to reduce impacts to the combined LS 608 and 610 and to femtocell transceiver 624 since interface i/f 1 may be supported according the existing 3GPP control pane location solution for UMTS whereas interface i/f 3 may be supported according to the existing OMA SUPL solution which may avoid adding new impacts not already defined for these solutions.

Figure 7:
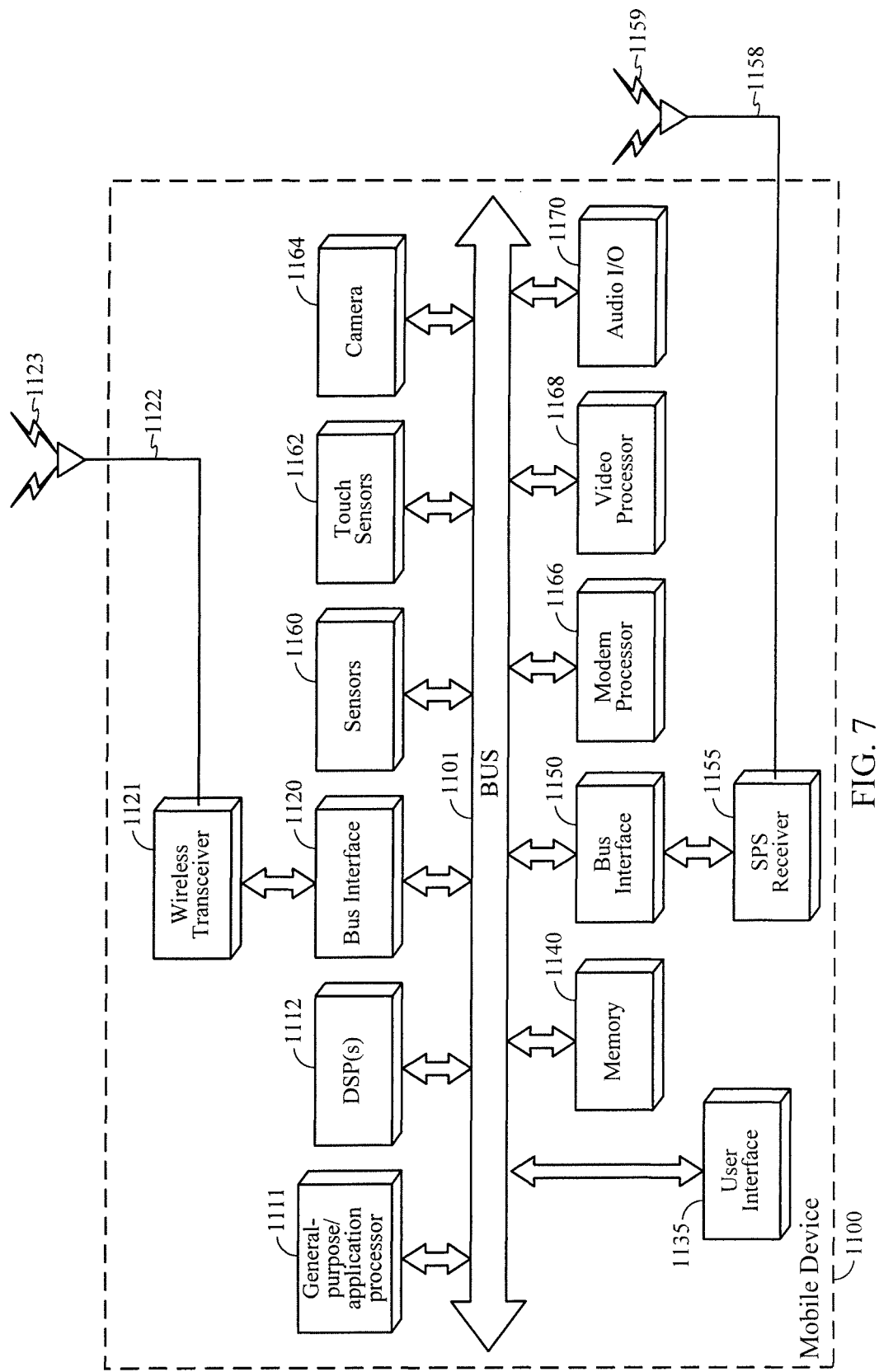
FIG. 7 is a schematic block diagram illustrating an exemplary device, in accordance with an example implementation.

FIG. 7 is a schematic diagram of a mobile device 1100 which may represent or correspond in some embodiments to mobile device 100 in FIG. 1, mobile device 204 in FIG. 2 and FIG. 3, mobile device 504 in FIG. 5 and/or mobile device 604 in FIG. 6. For example, mobile device 100 (FIG. 1) may comprise one or more features of mobile device 1100 shown in FIG. 7. In certain embodiments, mobile device 1100 may comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to corresponding multiple wireless communication standards such as, for example, versions of IEEE Std. 802.11, CDMA2000, WCDMA, LTE, UMTS, GSM, AMPS, Zigbee and Bluetooth, just to name a few examples. In some embodiments wireless transceiver may comprise or be part of a modem 306.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1100. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals (e.g., signals acquired from wireless transceiver 1121) for use in performing positioning operations may be performed in memory 1140 or registers (not shown). General-purpose processor(s) 1111, memory 1140, DSP(s) 1112 and/or specialized processors may comprise or may provide support for (e.g. may enable location related measurements on behalf of) a positioning engine (e.g., PE 302) for use in processing measurements to estimate a location of mobile device 1100.

Also shown in FIG. 7, mobile device 1100 may comprise digital signal processor(s) (DSP(s)) 1112 connected to the bus 1101 (e.g. by bus interface 1110), general-purpose processor(s) 1111 connected to the bus 1101 (e.g. by bus interface 1110) and memory 1140. A bus interface (e.g. bus interface 1110) may be integrated with the DSP(s) 1112, general-purpose processor(s) 1111 and memory 1140. In various embodiments, functions may be performed in response to execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Execution of the one or more instructions may supports functions described herein for a mobile device such as process 400 shown in FIG. 4A. Moreover, machine-readable instructions stored in memory 1140 may enable support for a modem 306, PE 302 and one or more Apps 304. Memory 1140 may comprise a non-transitory processor-readable memory and/or a computer-readable memory that stores software code (programming code, instructions, etc.) that are executable by processor(s) 1111 and/or DSP(s) 1112 to perform functions described herein.

Also shown in FIG. 7, a user interface 1135 may comprise any one of several devices such as, for example, a speaker, microphone, display device, vibration device, keyboard, touch screen, just to name a few examples. In a particular implementation, user interface 1135 may enable a user to interact with one or more applications (e.g. an App 304) hosted on mobile device 1100. For example, devices of user interface 1135 may store analog or digital signals on memory 1140 to be further processed by DSP(s) 1112 or general purpose processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors that may enable mobile device 1100 to determine relative changes in location and/or current speed and heading. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose application processor 1111 in support of one or more applications such as, for example, applications directed to positioning or navigation operations.

In a particular implementation, mobile device 1100 may comprise a dedicated modem processor 1166 capable of performing baseband processing of signals received and down converted at wireless transceiver 1121 or SPS receiver 1155. Similarly, modem processor 1166 may perform baseband processing of signals to be up converted for transmission by wireless transceiver 1121. In some implementations, modem processor may comprise or be part of modem 306. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

Figure 8:
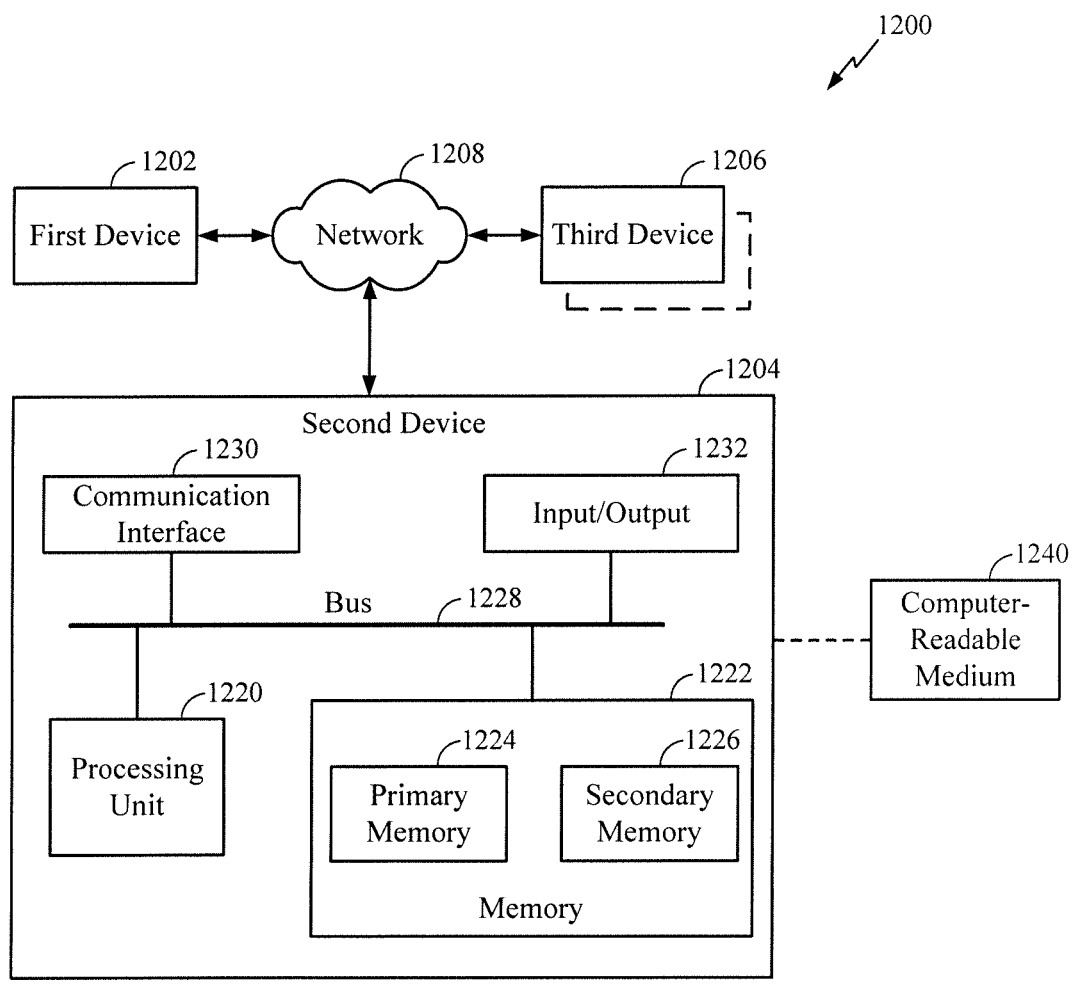
FIG. 8 is a schematic block diagram of an example computing platform in accordance with an example implementation.

FIG. 8 is a schematic diagram illustrating an example system 1200 that may include one or more devices configurable to implement techniques or processes described above, for example, in connection with FIG. 1. System 1200 may include, for example, a first device 1202, a second device 1204, and a third device 1206, which may be operatively coupled together through a wireless communications network 1208. In an aspect, first device 1202 may comprise a server capable of providing positioning assistance data such as, for example, a base station almanac. Also, in an aspect, wireless communications network 1208 may comprise one or more wireless access points, for example. However, claimed subject matter is not limited in scope in these respects.

First device 1202, second device 1204 and third device 1206, as shown in FIG. 8, may be representative of or correspond to any device, appliance or machine, such as: (i) femtocell transceiver 110 and/or servers 140, 150 or 155 shown in FIG. 1; LS 206, LBS AS 212, ALN DB 208, Map DB 210 and/or one or more APs or Femtocells in ALN 202 shown in FIG. 2; (iii) LS 206, LBS AS 212 and/or one or more APs or Femtocells in ALN 202 shown in FIG. 3; (iv) femtocell transceiver 524, HeNB GW 514, LS 506, LS 508 and/or LS 510 shown in FIG. 5; and/or (v) femtocell transceiver 624, HNB GW 614, LS 606, LS 608 and/or LS 610 shown in FIG. 6. Network 1208 in FIG. 8 may correspond to network 130 shown in FIG. 1, network 520 shown in FIG. 5 and/or network 620 shown in FIG. 6. By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1202, 1204, and 1206, respectively, may comprise one or more of a base station almanac server, a base station, a femtocell or a mobile device in accordance with the examples described herein.

Similarly, wireless communications network 1208 (e.g., in a particular of implementation of network 130 shown in FIG. 1), may be representative of one or more communication links, processes, or resources configurable to support the exchange of data between at least two of first device 1202, second device 1204, and third device 1206. By way of example but not limitation, wireless communications network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1206, there may be additional like devices operatively coupled to wireless communications network 1208.

It is recognized that all or part of the various devices and networks shown in system 1200, and the processes and methods as further described herein, may be implemented using or otherwise including hardware, firmware, software, or any combination thereof. Thus, by way of example but not limitation, second device 1204 may include at least one processing unit 1220 that is operatively coupled to a memory 1222 through a bus 1228.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220.

In a particular implementation, a digital map of an indoor area may be stored in a particular format in memory 1222. Processing unit 1220 may execute instructions to processes the stored digital map to identify and classify component areas bounded by a perimeter of structures indicated in the digital map. As pointed out above, these executed instructions may specify identifying and characterizing egress segments in structures forming a perimeter bounding a component area and classifying the bounded component area based, at least in part, on a proportionality of a size of at least one identified egress segment to a size of at least one dimension of the bounded component area.

Secondary memory 1226 may include, for example, the same or similar type of memory as primary memory or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory medium that can carry or make accessible data, code or instructions for one or more of the devices in system 1200. Computer-readable medium 1240 may also be referred to as a storage medium.

Second device 1204 may include, for example, a communication interface 1230 that provides for or otherwise supports the operative coupling of second device 1204 to at least wireless communications network 1208. By way of example but not limitation, communication interface 1230 may include a network interface device or card, a modem, a router, a switch, a transceiver, and the like. Communication interface 1230 may support wireless communication (e.g. according to GSM, UMTS, LTE, CDMA2000, IEEE 802.11 to name a few examples) and/or wireline communication (e.g. via DSL, packet cable, IP, TCP/IP, SCTP/IP to name a few examples).

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/output device 1232 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, microcontrollers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "architecture", "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as CDMA2000, Wideband CDMA ("WCDMA"), to name just a few radio technologies. Here, CDMA2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and WCDMA are described in documents from a consortium named "3rd Generation Partnership Project" ("3GPP"). CDMA2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via UMTS (e.g. WCDMA) or LTE, for example, and the femtocell may provide the mobile device access to a larger cellular telecommunication network by way of another broadband network such as the Internet.

Techniques described herein may be used with an SPS that includes any one of several GNSS (e.g. GPS, Galileo, GLONASS and/or Beidou) and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method, at a mobile device capable of accessing a network, comprising:
   determining a global unique identifier for said mobile device, the global unique identifier being recognizable by femtocell transceivers in a venue, said global unique identifier being determined independently of a public operator-defined globally unique identifier associated with said network;
   transmitting at least one message to a location server comprising said global unique identifier and a media access control (MAC) address; and
   transmitting one or more wireless signals comprising said global unique identifier to at least one of said femtocell transceivers for supporting positioning operations by said at least one of said femtocell transceivers in communication with said location server.

2. The method of claim 1, wherein the one or more wireless signals are transmitted not in response to a request from said at least one of said femtocell transceivers.

3. The method of claim 1, wherein said positioning operations comprise network centric positioning operations.

4. The method of claim 1, wherein said global unique identifier comprises a concatenation of a unique ID assigned to a provider of the mobile device and a local identifier assigned by said provider of the mobile device.

5. The method of claim 4, wherein the provider of the mobile device comprises a provider of at least one of a high level operating system, a positioning engine, a modem, an application, a subscriber identity module or a universal subscriber identity module for said mobile device.

6. The method of claim 5, wherein said positioning engine comprises a hardcoded device configured to perform positioning operations.

7. The method of claim 5, wherein said positioning engine comprises machine-readable instructions which are executable by a processor to perform positioning operations.

8. The method of claim 1, wherein said location server comprises at least one of a Secure User Plane Location (SUPL) Location Platform (SLP), an enhanced serving mobile location center (E-SMLC) or a standalone serving mobile location center (SAS) and wherein transmitting the at least one message to the location server comprises transmitting said at least one message through a femtocell transceiver and a local routing device connected to said femtocell transceiver.

9. The method of claim 8, wherein the femtocell transceiver comprises a Home evolved eNodeB (HeNB) configured according to Long Term Evolution (LTE), and wherein communication with said location server comprises sending and receiving LTE Positioning Protocol A (LPPa) messages.

10. The method of claim 8, wherein the femtocell transceiver comprises a Home Node B (HNB) configured according to UMTS, and wherein communication with said location server comprises sending and receiving Positioning Calculation Application Part (PCAP) messages.

11. The method of claim 1 further comprising obtaining location services by an application on said mobile device from a Location Based Services Application Server (LBS AS), wherein said application provides said global unique identifier to said LBS AS to enable said LBS AS to identify said mobile device to said location server.

12. A mobile device capable of accessing a network comprising:
   a transceiver to transmit messages to and receive messages from a wireless communication network; and
   one or more processors to:
   determine a global unique identifier for said mobile device, the global unique identifier being recognizable by femtocell transceivers in a venue, said global unique identifier being determined independently of a public operator-defined globally unique identifier associated with said network;

initiate transmission of at least one message through said transceiver to a location server, the at least one message comprising said global unique identifier and a media access control (MAC) address; and initiate transmission of one or more wireless signals comprising said global unique identifier through said transceiver to at least one of said femtocell transceivers for supporting positioning operations by said at least one of said femtocell transceivers in communication with said location server.

13. The mobile device of claim 12, wherein the location server comprises a local SUPL Location Platform (SLP), and wherein the at least one message is transmitted to the location server through a femtocell transceiver and a local routing device connected to said location server.

14. The mobile device of claim 12, wherein the one or more wireless signals are transmitted not in response to a request from said at least one of said femtocell transceivers.

15. The mobile device of claim 12, wherein said global unique identifier comprises a concatenation of a unique ID assigned to a provider of the mobile device and a local identifier assigned by said provider of the mobile device.

16. The mobile device of claim 15, wherein the provider of the mobile device comprises a provider of at least one of a high level operating system, a positioning engine, a modem, an application, a subscriber identity module or a universal subscriber identity module for said mobile device.

17. The mobile device of claim 16, wherein said positioning engine comprises a hardcoded device configured to perform positioning operations.

18. The mobile device of claim 16, wherein said positioning engine comprises machine-readable instructions which are executable by a processor to perform positioning operations.

19. A non-transitory storage medium comprising machine-readable instructions stored thereon which are executable by a special purpose computing apparatus of a mobile device capable of accessing a network to:

determine a global unique identifier for said mobile device, the global unique identifier being recognizable by femtocell transceivers in a venue, said global unique identifier being determined independently of a public operator-defined globally unique identifier associated with said network;

initiate transmission of at least one message to a location server, the at least one message comprising said global unique identifier and a media access control (MAC) address; and initiate transmission of one or more wireless signals comprising said global unique identifier to at least one of said femtocell transceivers for supporting positioning operations by said at least one of said femtocell transceivers in communication with said location server.

20. An apparatus at a mobile device capable of accessing a network, comprising:

means for determining a global unique identifier for said mobile device, the global unique identifier being recognizable by femtocell transceivers in a venue, said global unique identifier being determined independently of a public operator-defined globally unique identifier associated with said network;

means for transmitting at least one message to a location server comprising said global unique identifier and a media access control (MAC) address; and means for transmitting one or more wireless signals comprising said global unique identifier to at least one of said femtocell transceivers for supporting positioning operations by said at least one of said femtocell transceivers in communication with said location server.

21. A method comprising, at a femtocell transceiver:

acquiring one or more wireless signals transmitted from a mobile device to obtain a global unique identifier determined at said mobile device independently of an operator-defined globally unique identifier associated with a network that said mobile device is capable of accessing, and to obtain one or more measurements of one or more characteristics of said one or more wireless signals, wherein said acquired global unique identifier is other than a media access control (MAC) address; and transmitting one or more messages comprising said one or more measurements and said global unique identifier to a location server for use in positioning operations.

22. The method of claim 21, wherein the one or more wireless signals are transmitted not in response to a request from said femtocell transceiver.

23. The method of claim 21, wherein said positioning operations comprise network centric positioning operations.

24. The method of claim 21, wherein said global unique identifier comprises a concatenation of a unique ID assigned to a provider of said mobile device and a local identifier assigned by said provider of said mobile device.

25. The method of claim 24, wherein said provider of said mobile device comprises a provider of at least one of a high level operating system, a positioning engine, a modem, an application, a subscriber identity module or a universal subscriber identity module for said mobile device.

26. The method of claim 21, wherein said location server comprises at least one of a Secure User Plane Location (SUPL) Location Platform (SLP), an enhanced serving mobile location center (E-SMLC) or a standalone serving mobile location center (SAS), and wherein transmitting the one or more messages to the location server comprises transmitting said one or more messages through a local routing device connected to said femtocell transceiver.

27. The method of claim 26, wherein the femtocell transceiver comprises a Home evolved eNodeB (HeNB) configured according to Long Term Evolution (LTE), and wherein transmitting one or more messages to said location server comprises transmitting LTE Positioning Protocol A (LPPa) messages.

28. The method of claim 26, wherein the femtocell transceiver comprises a Home Node B (HNB) configured according to UMTS, and wherein transmitting one or more messages to said location server comprises transmitting Positioning Calculation Application Part (PCAP) messages.

29. The method of claim 26, wherein said one or more measurements comprises at least one Received Signal Strength Indication (RSSI) measurement.

30. The method of claim 26, wherein said one or more measurements comprises at least one round trip signal propagation time (RTT) measurement.

31. The method of claim 26, wherein said one or more measurements comprises at least one angle of arrival (AOA) measurement.

32. A femtocell transceiver comprising:
a wireless receiver;
a transmitter; and
one or more processors to:
  obtain a global unique identifier from one or more wireless signals transmitted by a mobile device and acquired at said wireless receiver, the global unique identifier being determined at said mobile device independently of an operator-defined globally unique identifier associated with a network that said mobile device is capable of accessing, wherein said obtained global unique identifier is other than a media access control (MAC) address;
  obtain one or more measurements of one or more characteristic of said acquired one or more wireless signals; and
  initiate transmission of one or more messages through said transmitter comprising said one or more measurements and said global unique identifier to a location server for use in positioning operations.

33. The femtocell transceiver of claim 32, wherein the one or more wireless signals are transmitted not in response to a request from said femtocell transceiver.

34. The femtocell transceiver of claim 32, wherein said positioning operations comprise network centric positioning operations.

35. The femtocell transceiver of claim 32, wherein said global unique identifier comprises a concatenation of a unique ID assigned to a provider of a positioning engine of the mobile device and a local identifier assigned by said provider of the mobile device.

36. The femtocell transceiver of claim 32, wherein the location server comprises a local SUPL Location Platform (SLP), and wherein transmitting the one or more messages to the location server comprises transmitting said one or more messages through a local routing device connected to said location server.

37. The femtocell transceiver of claim 36, wherein the femtocell transceiver is configured according to LTE, and wherein one or more messages are transmitted to a local SLP as LPPa messages.

38. The femtocell transceiver of claim 37, wherein the femtocell transceiver is configured according to UMTS, and wherein one or more messages are transmitted to the local SLP as PCAP messages.

39. The femtocell transceiver of claim 32, wherein said one or more measurements comprises at least one RSSI measurement.

40. The femtocell transceiver of claim 32, wherein said one or more measurements comprises at least one RTT measurement.

41. The femtocell transceiver of claim 32, wherein said one or more measurements comprises at least one AOA measurement.

42. A non-transitory storage medium comprising machine-readable instructions stored thereon which are executable by a special purpose computing apparatus of a femtocell transceiver to:
  obtain a global unique identifier from one or more wireless signals transmitted by a mobile device and acquired at said femtocell transceiver, the global unique identifier being determined at said mobile device independently of an operator-defined globally unique identifier associated with a network that said mobile device is capable of accessing, wherein said obtained global unique identifier is other than a media access control (MAC) address;
  obtain one or more measurements of one or more characteristic of said acquired one or more wireless signals; and
  initiate transmission of one or more messages comprising said one or more measurements and said global unique identifier to a location server for use in positioning operations.

43. An apparatus at a femtocell transceiver comprising:
means for acquiring one or more wireless signals transmitted from a mobile device to obtain a global unique identifier determined at said mobile device independently of an operator-defined globally unique identifier associated with a network that said mobile device is capable of accessing, and to obtain measurements of one or more characteristics of said one or more wireless signals, wherein said obtained global unique identifier is other than a media access control (MAC) address; and
means for transmitting one or messages to comprising said one or more measurements and said global unique identifier to a location server for use in positioning operations.

44. A method, at a location server, comprising:
receiving a first message from a mobile device comprising a global unique identifier and a media access control (MAC) address for said mobile device, wherein said global unique identifier is recognizable by femtocell transceivers in a venue and is determined independently of a public operator-defined globally unique identifier associated with a network that said mobile device is capable of accessing;
receiving a second message from a femtocell transceiver comprising said global unique identifier and one or more measurements obtained by said femtocell transceiver, wherein said one or measurements are of one or more characteristics of one or more wireless signals transmitted by said mobile device and comprising or being associated with said global unique identifier; and
performing one or more positioning operations for said mobile device based, at least in part, on said one or more measurements.

45. The method of claim 44, wherein the one or more wireless signals are transmitted not in response to a request from said femtocell transceiver.

46. The method of claim 44, wherein said positioning operations comprise network centric positioning operations.

47. The method of claim 44, wherein said global unique identifier comprises a concatenation of a unique ID assigned to a provider of said mobile device and a local identifier assigned by said provider of said mobile device.

48. The method of claim 47, wherein said provider of said mobile device comprises a provider of at least one of a high level operating system, a positioning engine, a modem, an application, a subscriber identity module or a universal subscriber identity module for said mobile device.

49. The method of claim 44, wherein said location server comprises at least one of a Secure User Plane Location (SUPL) Location Platform (SLP), an enhanced serving mobile location center (E-SMLC) or a standalone serving mobile location center (SAS), and wherein receiving the second message comprises receiving said second message through a local routing device connected to said femtocell transceiver.

50. The method of claim 49, wherein the femtocell transceiver comprises a Home evolved eNodeB (HeNB) configured according to Long Term Evolution (LTE), and wherein transmitting one or more messages to said location server comprises transmitting LTE Positioning Protocol A (LPPa) messages.

51. The method of claim 44, and further comprising:
configuring the femtocell transceiver, to monitor signals transmitted by the mobile device and carrying or being associated with said global unique identifier.

52. A location server, comprising:
a communication interface; and
one or more processors to:
obtain a first message received at said communication interface from a mobile device comprising a global unique identifier and a media access control (MAC) address for said mobile device, wherein said global unique identifier is recognizable by femtocell transceivers in a venue and is determined independently of a public operator-defined globally unique identifier associated with a network that said mobile device is capable of accessing;
obtain a second message received at said communication interface from a femtocell transceiver comprising said global unique identifier and one or more measurements obtained by said femtocell transceiver, wherein said one or measurements are of one or more characteristics of one or more wireless signals transmitted by said mobile device and comprising or being associated with said global unique identifier; and
perform one or more positioning operations for said mobile device based, at least in part, on said one or more measurements.

53. An apparatus at a location server, comprising:
means for receiving a first message from a mobile device comprising a global unique identifier and a media access control (MAC) address for said mobile device, wherein said global unique identifier is recognizable by femtocell transceivers in a venue and is determined independently of a public operator-defined globally unique identifier associated with a network that said mobile device is capable of accessing;
means for receiving a second message from a femtocell transceiver comprising said global unique identifier and one or more measurements obtained by said femtocell transceiver, wherein said one or measurements are of one or more characteristics of one or more wireless signals transmitted by said mobile device and comprising or being associated with said global unique identifier; and
means for performing one or more positioning operations for said mobile device based, at least in part, on said one or more measurements.

54. A non-transitory storage medium comprising machine-readable instructions stored thereon which are executable by a special purpose computing apparatus of a location server to:
obtain a first message received from a mobile device comprising a global unique identifier and a media access control (MAC) address for said mobile device, wherein said global unique identifier is recognizable by femtocell transceivers in a venue and is determined independently of a public operator-defined globally unique identifier associated with a network that said mobile device is capable of accessing;
obtain a second message received from a femtocell transceiver comprising said global unique identifier and one or more measurements obtained by said femtocell transceiver, wherein said one or measurements are of one or more characteristics of one or more wireless signals transmitted by said mobile device and comprising or being associated with said global unique identifier; and
perform one or more positioning operations for said mobile device based, at least in part, on said one or more measurements.

* * * * *